US010539700B1

(12) United States Patent  
Sepänniitty et al.

(10) Patent No.: US 10,539,700 B1  
(45) Date of Patent: Jan. 21, 2020

(54) DIVING COMPUTER WITH COUPLED ANTENNA AND WATER CONTACT ASSEMBLY

(71) Applicant: Suunto Oy, Vantaa (FI)

(72) Inventors: Mikko Sepänniitty, Vantaa (FI); Ville Hurskainen, Vantaa (FI); Tapio Ståhlberg, Vantaa (FI)

(73) Assignee: Suunto Oy, Vantaa (FI)

( * ) Notice: Subject to any disclaimer, the term of this patent is extended or adjusted under 35 U.S.C. 154(b) by 0 days.

(21) Appl. No.: 16/352,915

(22) Filed: Mar. 14, 2019

(51) Int. Cl.  
*G06F 1/16* (2006.01)  
*G01V 3/02* (2006.01)  
*H01Q 1/22* (2006.01)  
*H01Q 1/04* (2006.01)

(52) U.S. Cl.  
CPC .............. *G01V 3/02* (2013.01); *G06F 1/1656* (2013.01); *G06F 1/1698* (2013.01); *H01Q 1/04* (2013.01); *H01Q 1/2266* (2013.01)

(58) Field of Classification Search  
CPC ....................................................... G06F 1/163  
USPC ........................... 361/679.01, 679.02, 679.03  
See application file for complete search history.

(56) References Cited

U.S. PATENT DOCUMENTS

| | | | |
|---|---|---|---|
| 3,976,121 A * | 8/1976 | Johnson | G01F 23/242 165/11.1 |
| 5,280,646 A | 1/1994 | Koyama et al. | |
| 5,673,054 A | 9/1997 | Hama | |
| 5,754,143 A | 5/1998 | Warnagiris et al. | |
| 5,946,610 A | 8/1999 | Hama | |
| 6,373,439 B1 | 4/2002 | Zuercher et al. | |
| 6,853,605 B2 | 2/2005 | Fujisawa et al. | |
| 7,151,496 B2 | 12/2006 | Casagrande | |
| 7,215,600 B1 | 5/2007 | Derosa | |
| 7,271,774 B2 | 9/2007 | Puuri | |
| 8,243,442 B2 * | 8/2012 | Hobson | H01H 13/705 200/302.2 |
| 10,271,299 B1 | 4/2019 | Sayem et al. | |
| 2002/0008663 A1 | 1/2002 | Suguro et al. | |
| 2004/0108861 A1 | 6/2004 | Germiquet et al. | |

(Continued)

FOREIGN PATENT DOCUMENTS

| CN | 204116829 U | 1/2015 |
|---|---|---|
| CN | 104659493 A | 5/2015 |

(Continued)

*Primary Examiner* — Anthony Q Edwards  
(74) *Attorney, Agent, or Firm* — Seppo Laine Oy

(57) ABSTRACT

The invention concerns a water contact detector assembly for detecting an underwater condition in a device, and the use of such an assembly in diving computers. The assembly comprises
- a device housing;
- a push-button component attached to the housing, the component comprising a button part and a hollow guide part, wherein the button part consists of a touch surface portion and a stud portion, the stud portion being arranged to slide inside the hollow guide part when the button part is being engaged by a user, and wherein the guide part is at least in part conductive and subject to be exposed to water when the device is submerged;
- a clip washer made of sheet metal that is received by the guide part to lock itself in place onto a conductive portion of the guide part;
- the clip washer being provided with a connector element extending a distance from the washer to provide an electrical connection to a contact stud in the device.

20 Claims, 16 Drawing Sheets

(56) References Cited

U.S. PATENT DOCUMENTS

| | | |
|---|---|---|
| 2005/0054321 A1 | 3/2005 | Casagrande et al. |
| 2005/0174294 A1 | 8/2005 | Peroulis et al. |
| 2005/0219955 A1 | 10/2005 | Xu et al. |
| 2005/0243486 A1 | 11/2005 | Wingfiel et al. |
| 2006/0097918 A1 | 5/2006 | Oshiyama et al. |
| 2006/0227058 A1 | 10/2006 | Zellweger |
| 2007/0146218 A1 | 6/2007 | Turner et al. |
| 2008/0150816 A1 | 6/2008 | Rahola et al. |
| 2008/0291591 A1 | 11/2008 | Huang et al. |
| 2009/0256758 A1 | 10/2009 | Schlub et al. |
| 2009/0312655 A1 | 12/2009 | Lo |
| 2009/0312656 A1 | 12/2009 | Lau et al. |
| 2010/0023095 A1 | 1/2010 | Stevenson et al. |
| 2010/0238080 A1 | 9/2010 | Lindberg et al. |
| 2011/0013491 A1 | 1/2011 | Fujisawa |
| 2011/0102274 A1 | 5/2011 | Fujisawa |
| 2011/0128200 A1 | 6/2011 | Hossain et al. |
| 2011/0148723 A1 | 6/2011 | Bengtsson |
| 2012/0105288 A1 | 5/2012 | Abe |
| 2012/0105888 A1 | 5/2012 | Nakayama |
| 2012/0120772 A1 | 5/2012 | Fujisawa |
| 2012/0146865 A1 | 6/2012 | Hayashi et al. |
| 2013/0181873 A1 | 7/2013 | Gutschenritter et al. |
| 2013/0210297 A1 | 8/2013 | Maas et al. |
| 2014/0085153 A1 | 3/2014 | Nagahama |
| 2014/0085154 A1 | 3/2014 | Nagahama |
| 2014/0139637 A1* | 5/2014 | Mistry ................ H04N 5/2252 348/46 |
| 2014/0225786 A1 | 8/2014 | Lyons et al. |
| 2014/0232603 A1 | 8/2014 | Fujisawa |
| 2014/0240181 A1 | 8/2014 | Mamuro et al. |
| 2014/0253150 A1 | 9/2014 | Menzel et al. |
| 2014/0253393 A1 | 9/2014 | Nissinen et al. |
| 2014/0253394 A1 | 9/2014 | Nissinen et al. |
| 2014/0266920 A1 | 9/2014 | Tran et al. |
| 2014/0266938 A1 | 9/2014 | Ouyang et al. |
| 2014/0306859 A1 | 10/2014 | Desclos et al. |
| 2014/0333494 A1 | 11/2014 | Huang |
| 2015/0048979 A1 | 2/2015 | Asrani et al. |
| 2015/0109172 A1 | 4/2015 | Iijima |
| 2015/0188217 A1 | 7/2015 | Tsai et al. |
| 2015/0220066 A1 | 8/2015 | Fujisawa |
| 2015/0349410 A1 | 12/2015 | Russell et al. |
| 2016/0006109 A1 | 1/2016 | Apaydin et al. |
| 2016/0056533 A1 | 2/2016 | Nissinen et al. |
| 2016/0099497 A1 | 4/2016 | Lee |
| 2016/0308272 A1 | 10/2016 | Standke et al. |
| 2016/0344096 A1 | 11/2016 | Erentok |
| 2017/0179581 A1 | 6/2017 | Puuri et al. |
| 2017/0187096 A1 | 6/2017 | Hwang et al. |
| 2018/0129168 A1* | 5/2018 | Chan ..................... G04G 17/08 |
| 2018/0287248 A1 | 10/2018 | Han et al. |
| 2018/0356861 A1* | 12/2018 | Ichikawa ............. G06F 1/1656 |
| 2019/0058256 A1 | 2/2019 | Sepänniitty et al. |
| 2019/0072912 A1* | 3/2019 | Pandya ............. A61B 5/02427 |
| 2019/0210703 A1 | 7/2019 | Sepänniitty et al. |

FOREIGN PATENT DOCUMENTS

| | | |
|---|---|---|
| CN | 204424456 U | 6/2015 |
| CN | 105785757 A | 7/2016 |
| CN | 104638361 B | 3/2017 |
| EP | 0745915 A2 | 12/1996 |
| EP | 0871238 A2 | 10/1998 |
| EP | 1178374 A2 | 2/2002 |
| EP | 1689023 A1 | 8/2006 |
| EP | 2019448 A1 | 1/2009 |
| EP | 2056395 A1 | 5/2009 |
| EP | 2317602 A1 | 5/2011 |
| FI | 20155124 A | 9/2015 |
| GB | 2276274 A | 9/1994 |
| GB | 2431522 A | 4/2007 |
| JP | H04227301 A | 8/1992 |
| JP | H08330826 A | 12/1996 |
| JP | 2002261533 A | 9/2002 |
| JP | 3611591 B2 | 1/2005 |
| WO | WO2004038856 A1 | 5/2004 |
| WO | WO2011000438 A1 | 1/2011 |
| WO | WO2016167914 A1 | 10/2016 |
| WO | WO2017088164 A1 | 6/2017 |
| WO | WO2018183678 A1 | 10/2018 |
| WO | WO2019135856 A1 | 7/2019 |

* cited by examiner

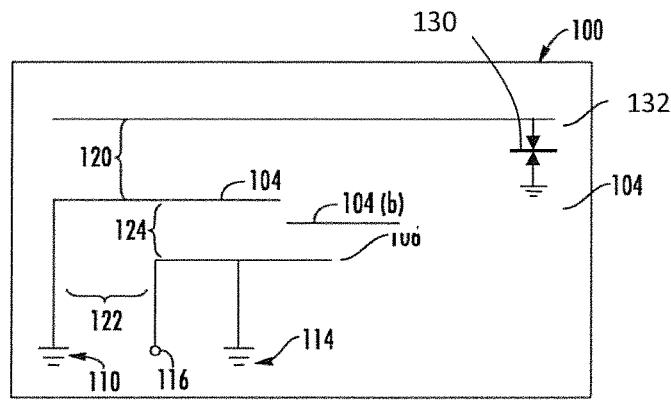
FIG. 14
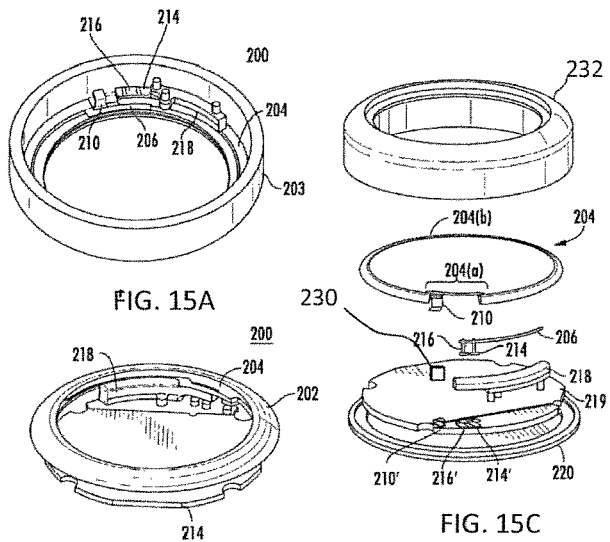
FIG. 15A
FIG. 15B
FIG. 15C
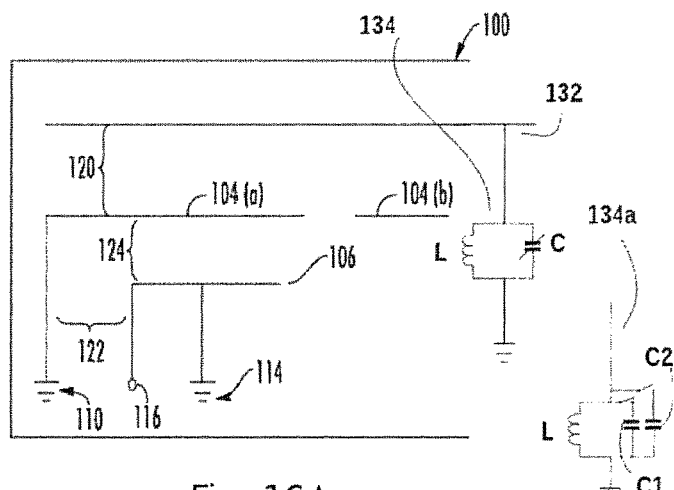
Fig. 16A
Fig. 16B

DIVING COMPUTER WITH COUPLED ANTENNA AND WATER CONTACT ASSEMBLY

BACKGROUND

1. Technological Field

The present disclosure relates generally to an antenna apparatus for use in electronic devices such as wireless or portable radio devices, and more particularly in one exemplary aspect to an antenna apparatus for use within a metal device or a device with a metallic surface, and methods of utilizing the same. Specifically, the present invention relates to diving computers and water contact detection assembles for such.

2. Description of Related Technology

Antennas are commonly found in most modern radio devices, such as mobile computers, portable navigation devices, mobile phones, smartphones, personal digital assistants (PDAs), or other personal communication devices (PCD). Typically, these antennas comprise a planar radiating element with a ground plane that is generally parallel to the planar radiating element. The planar radiating element and the ground plane are typically connected to one another via a short-circuit conductor in order to achieve the desired impedance matching for the antenna. The structure is configured so that it functions as a resonator at the desired operating frequency. Typically, these internal antennas are located on a printed circuit board (PCB) of the radio device inside a plastic enclosure that permits propagation of radio frequency waves to and from the antenna(s).

More recently, it has been desirable for these radio devices to include a metal body or an external metallic surface. A metal body or an external metallic surface may be used for any number of reasons including, for example, providing aesthetic benefits such as producing a pleasing look and feel for the underlying radio device. However, the use of a metallic enclosure creates new challenges for radio frequency (RF) antenna implementations. Typical prior art antenna solutions are often inadequate for use with metallic housings and/or external metallic surfaces. This is due to the fact that the metal housing and/or external metallic surface of the radio device acts as an RF shield which degrades antenna performance, particularly when the antenna is required to operate in several frequency bands.

In the case of diving computers, at least part of the body is usually made of a non-conductive polymer material. In order to detect an underwater condition in such devices, a water contact needs to be provided. These usually consist of a couple of apertures in the body, through which water may enter to conductive surfaces connected to a water detection circuit in the housing, Current flowing through the water between such conductive surfaces is detected, and an underwater condition of the device may be established. The device may then be configured accordingly, e.g. be switched to a dive state. The diving computer may also collect information from other sensors, such a pressure sensor, when determining the correct course of action in an underwater situation.

Making apertures or holes in the housing of a diving computer is however something that needs to be avoided as much as possible. Every hole must be carefully designed and sealed to avoid water entering the system, also under high water pressure conditions.

Accordingly, there is a salient need for a water detection solution for use with, for example, a diving computer device that requires less or no extra apertures or holes in the body.

SUMMARY

The present disclosure satisfies the foregoing needs by providing a water contact detection assembly arranged to sense an underwater condition for use within a metal or plastic housing.

In a first aspect, a water contact detector assembly for detecting an underwater condition in a device is provided. The assembly comprises:
 a device housing;
 a push-button component attached to the housing, the component comprising a button part and a hollow guide part, wherein the button part consists of a touch surface portion and a stud portion, the stud portion being arranged to slide inside the hollow guide part when the button part is being engaged by a user, and wherein the guide part is at least in part conductive and subject to be exposed to water when the device is submerged;
 a clip washer made of sheet metal that is received by the guide part to lock itself in place onto a conductive portion of the guide part;
 the clip washer being provided with a connector element extending a distance from the washer to provide an electrical connection to a contact stud in the device.

In some embodiments, the connector element is integral with the clip washer and extends from the same as a flexible tongue.

In some embodiments, the clip washer is locked onto the guide part by means of sharp inner edges of the clip cutting into the guide part material when assembled. In other embodiments, the clip washer may be locked onto the guide part by means of inner edges of the clip locking with a spring force into a groove of the guide part material.

In some embodiments the connector element provides an electrical connection to a contact stud of a water contact detector circuit arranged to sense an underwater condition of the device.

In some embodiments, the device housing is at the aperture which interfaces with the push-button component provided with grooves flushing water to a water contact surface area of the guide part.

In some embodiments, the clip washer may be supported by the device housing at a point which prevents it from rotating around the guide part.

The invention also concerns the aspect of using the inventive water contact detector assembly in a diving computer.

Further features of the present disclosure, its nature and various advantages will be more apparent from the accompanying drawings and the following detailed description.

BRIEF DESCRIPTION OF THE DRAWINGS

The features, objectives, and advantages of the present disclosure will become more apparent from the detailed description set forth below when taken in conjunction with the drawings, wherein:

FIG. 14 shows an embodiment of a coupled antenna apparatus;

FIG. 15A is a perspective view of the underside of an example of a wrist wearable electronic device in accordance with the principles of the present disclosure;

FIG. 15B is a perspective of the wrist wearable electronic device of FIG. 15A configured according to a fourth embodiment of the present disclosure;

FIG. 15C is an exploded view of the wrist wearable electronic device of FIGS. 15A-15B detailing various components of a coupled antenna apparatus in accordance with the principles of the present disclosure;

FIGS. 16A and 16B show embodiments of a coupled antenna apparatus,

DETAILED DESCRIPTION OF THE PREFERRED EMBODIMENT

Figure 1:
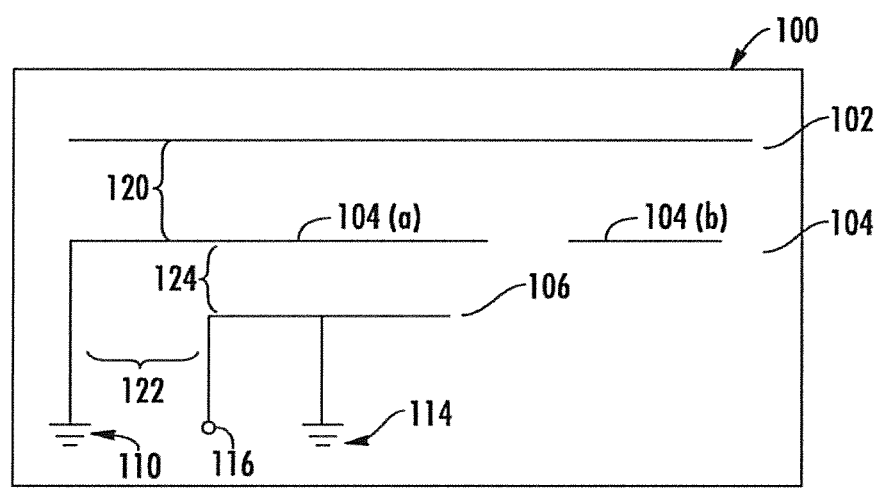
FIG. 1 is a schematic diagram detailing the antenna apparatus according to one embodiment of the disclosure.

Reference is now made to the drawings wherein like numerals refer to like parts throughout.

As used herein, the terms "antenna", and "antenna assembly" refer without limitation to any system that incorporates a single element, multiple elements, or one or more arrays of elements that receive/transmit and/or propagate one or more frequency bands of electromagnetic radiation. The radiation may be of numerous types, e.g., microwave, millimeter wave, radio frequency, digital modulated, analog, analog/digital encoded, digitally encoded millimeter wave energy, or the like. The energy may be transmitted from location to another location, using, or more repeater links, and one or more locations may be mobile, stationary, or fixed to a location on earth such as a base station.

As used herein, the terms "board" and "substrate" refer generally and without limitation to any substantially planar or curved surface or component upon which other components can be disposed. For example, a substrate may comprise a single or multi-layered printed circuit board (e.g., FR4), a semi-conductive die or wafer, or even a surface of a housing or other device component, and may be substantially rigid or alternatively at least somewhat flexible.

The terms "frequency range", and "frequency band" refer without limitation to any frequency range for communicating signals. Such signals may be communicated pursuant to one or more standards or wireless air interfaces.

As used herein, the terms "portable device", "mobile device", "client device", and "computing device", include, but are not limited to, personal computers (PCs) and mini-computers, whether desktop, laptop, or otherwise, set-top boxes, personal digital assistants (PDAs), handheld computers, personal communicators, tablet computers, portable navigation aids, J2ME equipped devices, cellular telephones, smartphones, tablet computers, personal integrated communication or entertainment devices, portable navigation devices, or literally any other device capable of processing data.

Furthermore, as used herein, the terms "radiator," "radiating plane," and "radiating element" refer without limitation to an element that can function as part of a system that receives and/or transmits radio-frequency electromagnetic radiation; e.g., an antenna. Hence, an exemplary radiator may receive electromagnetic radiation, transmit electromagnetic radiation, or both.

The terms "feed", and "RF feed" refer without limitation to any energy conductor and coupling element(s) that can transfer energy, transform impedance, enhance performance characteristics, and conform impedance properties between an incoming/outgoing RF energy signals to that of one or more connective elements, such as for example a radiator.

As used herein, the terms "top", "bottom", "side", "up", "down", "left", "right", and the like merely connote a relative position or geometry of one component to another, and in no way connote an absolute frame of reference or any required orientation. For example, a "top" portion of a component may actually reside below a "bottom" portion when the component is mounted to another device (e.g., to the underside of a PCB).

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, CDPD, satellite systems such as GPS and GLONASS, and millimeter wave or microwave systems.

Overview

In one salient aspect, the present disclosure provides improved antenna apparatus and methods of use and tuning. In one exemplary embodiment, the solution of the present disclosure is particularly adapted for small form-factor, metal-encased applications that utilize satellite wireless links (e.g., GPS), and uses an electromagnetic (e.g., capacitive, in one embodiment) feeding method that includes one or more separate feed elements that are not galvanically connected to a radiating element of the antenna. In addition, certain implementations of the antenna apparatus offer the capability to carry more than one operating band for the antenna.

DETAILED DESCRIPTION OF EXEMPLARY EMBODIMENTS

Detailed descriptions of the various embodiments and variants of the apparatus and methods of the disclosure are now provided. While primarily discussed in the context of portable radio devices, such as wristwatches, the various apparatus and methodologies discussed herein are not so limited. In fact, many of the apparatus and methodologies described herein are useful in any number of devices, including both mobile and fixed devices that can benefit from the coupled antenna apparatus and methodologies described herein.

Furthermore, while the embodiments of the coupled antenna apparatus of FIGS. 1-6B are discussed primarily in the context of operation within the GPS wireless spectrum, the present disclosure is not so limited. In fact, the antenna apparatus of FIGS. 1-6B are useful in any number of operating bands including, without limitation, the operating bands for: GLONASS, Wi-Fi, Bluetooth, 3G (e.g., 3GPP, 3GPP2, and UMTS), HSDPA/HSUPA, TDMA, CDMA (e.g., IS-95A, WCDMA, etc.), FESS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, and CDPD.

Exemplary Antenna Apparatus

Referring now to FIG. 1, one exemplary embodiment of a coupled antenna apparatus 100 is shown and described in detail. As shown in FIG. 1, the coupled antenna apparatus 100 includes three (3) main antenna elements, including an outer element 102 that is disposed adjacent to a middle radiator element 104 and an inside feed element 106. The radiator element 104, feed element 106, and the outer element 102 are not in galvanic connection with one another, and instead are capacitively coupled as discussed below. The outer element 102 is further configured to act as the primary radiator element for the antenna apparatus 100. The width of the outer element and the distance of the outer element from the middle element are selected based on specific antenna design requirements, including (i) the frequency operating band of interest, and (ii) the operating bandwidth, exemplary values of which can be readily implemented by one of ordinary skill given the present disclosure.

As shown in FIG. 1, the middle radiator element of the coupled antenna apparatus is disposed adjacent the outer element, and is separated from the outer element by a gap distance 120. For example, in one implementation, a distance of 0.2-1 mm is used, but it will be appreciated that this value may vary depending on implementation and operating frequency. Moreover, the coupling strength can be adjusted by adjusting the gap distance and by adjusting the overlapping area of the outer and middle radiator elements and by the total area of both the outer and middle radiator elements. The gap 120 enables the tuning of, inter alia, the antenna resonant frequency, bandwidth, and radiation efficiency. The middle radiator element further comprises two parts 104(*a*) and 104(*b*). The first part 104 *a* is the main coupling element, and the second part 104 *b* is left floating and not otherwise connected to the antenna structure. The second part 104 *b* can, for example, be left in the structure if for some mechanical reason the middle element is formed as a larger part, and only a shorter portion of it is needed as a coupling element. Disposed at one end of the middle radiator element part 104(*a*) is a short circuit point 110 for connecting the middle radiator element 104 to ground. The short circuit point 110 is in the illustrated embodiment located at a predefined distance 122 (typically 1-5 mm in the exemplary implementations, but may vary depending on implementation and operating frequency) from the inside feed element 106. The placement of the short circuit point 110 determines in part the resonant frequency of the coupled antenna apparatus 100. Part 104(*a*) is connected to part 104(*b*), wherein part 104(*b*) forms the complete middle radiator (ring).

FIG. 1 also illustrates an inner feed element 106 comprised of a ground point 114, as well as a galvanically connected feed point 116. The inner feed element 106 is disposed at a distance 124 from the middle radiator element 104. Furthermore, the placement and positioning of the ground point 114 with respect to the feed point 116 determines in part the resonant frequency of the coupled antenna apparatus 100. It is noted that the ground point of the feed element is primarily used for feed point impedance matching. In one implementation, the feed element forms and IFA-type (Inverted F Antenna) structure of the type known in the art, and impedance adjustment of such an element is well known by ordinary antenna designers, and accordingly not described further herein. A typical distance between the feed and ground points is on the order of 1-5 mm, but this may vary depending on frequency and application.

Moreover, it will be appreciated that the ground point may be eliminated if desired, such as by placing a shunt inductor onto the feed line. The placement of the feed point 116 and ground points 110 and 114 greatly affect the right-handed circular polarization (RHCP) and left-handed circular polarization (LHCP) isolation gains, as discussed below. As a brief aside, GPS and most satellite navigation transmissions are RHCP; satellites transmit the RHCP signal since it is found to be less affected by atmospheric signal deformation and loss than for example linearly polarized signals. Thus, any receiving antenna should have the same polarization as the transmitting satellite. Significant signal loss will occur (on the order of tens of dB) if the receiving device antenna is dominantly LHCP polarized. In addition the satellite signal will change polarization from RHCP to LHCP each time when it is reflected from an object, for example the earth's surface or a building. Signals that are reflected once near the receiving unit have almost the same amplitude but a small time delay and LHCP, as compared to directly received RHCP signals. These reflected signals are especially harmful to GPS receiver sensitivity, and thus it is preferred to use antennas in which LHCP gain is at minimum 5 dB to 10 dB lower than the RHCP gain.

For example, in the exemplary illustration, the feed and ground line placements are chosen for the RCHP gain to dominate and the LHCP gain to be suppressed (so as to enhance sensitivity to GPS circularly polarized signals). However, if the feed and ground lines placements were reversed, the "handedness" of the antenna apparatus 100 would be reversed, thereby creating a dominant LHCP gain, while suppressing RHCP gain. To this end, the present disclosure also contemplates in certain implementations the ability to switch or reconfigure the antenna e.g., on the fly, such as via a hardware or software switch, or manually, so as to switch the aforementioned "handedness" as desired for the particular use or application. It may for example be desired to operate in conjunction with a LHCP source, or receive the aforementioned reflected signals.

Accordingly, while not illustrated, the present disclosure contemplates: (i) portable or other devices having both RHCP-dominant and LHCP dominant antennas that can operate substantially independent of one another, and (ii) variants wherein the receiver can switch between the two, depending on the polarization of the signals being received.

The coupled antenna apparatus 100 of FIG. 1 thus comprises a stacked configuration comprising an outer element 102, a middle radiator element 104 disposed internal to the outer element, and an inside feed element 106. It is noted that one middle radiator element is enough to excite on the desired operating frequency. However, for multiband operation, additional middle elements and feed elements can be added. If, as one example, a 2.4 GHz ISM band is needed, then the same outer radiator can be fed by another set of middle element and feed elements. The inside feed element is further configured to be galvanically coupled with a feed point 116, and the middle radiator element is configured to be capacitively coupled to the inside feed element. The outer element 102 is configured to act as the final antenna radiator and is further configured to be capacitively coupled to the middle radiator element. In the present embodiment, the dimensions of the outer element 102, and the feed elements 104 and 106 are selected to achieve a desired performance. Specifically, if the elements (outer, middle, inner) are measured as separated from each other, none of them would be independently tuned to a value close to the desired operating frequency. When the three elements are coupled together, however, they form a single radiator package that creates resonances in the desired operating frequency (or frequencies). A relatively wide bandwidth of a single resonance is achieved due to the physical size of the antenna, and use of low dielectric mediums like plastic. One salient benefit of this structure in the exemplary context of satellite navigation applications is that there is a typical interest in covering both GPS and GLONASS navigation systems with same antenna, i.e., 1575-1610 MHz at minimum, which the exemplary implementation allows.

It will be appreciated by those skilled in the art given the present disclosure that the above dimensions correspond to one particular antenna/device embodiment, and are configured based on a specific implementation and are hence merely illustrative of the broader principles of the present disclosure. The distances 120, 122 and 124 are further selected to achieve desired impedance matching for the coupled antenna apparatus 100. For example, due to multiple elements that may be adjusted, it is possible to tune the resulting antenna to a desired operating frequency even if unit size (antenna size) varies largely. For instance, the top (outer) element size can be expanded to say 100 by 60 mm, and by adjusting the couplings between the elements, the correct tuning and matching can advantageously be achieved.

Portable Radio Device Configurations

Referring now to FIGS. 2A-5C, four (4) exemplary embodiments of a portable radio device comprising a coupled antenna apparatus configured in accordance with the principles of the present disclosure is shown and described. In addition, various implementations of the outer element are shown with respect to FIGS. 6A-6B that can be utilized in conjunction with the coupled antenna apparatus embodiments illustrated in FIGS. 2A-5C in order to further enable optimization of the various antenna operating characteristics. In some embodiments, one or more components of the antenna apparatus 100 of FIG. 1 are formed using a metal covered plastic body, fabricated by any suitable manufacturing method (such as, for example an exemplary laser direct structuring ("LDS") manufacturing process, or even a printing process such as that referenced below).

Recent advances in LDS antenna manufacturing processes have enabled the construction of antennas directly onto an otherwise non-conductive surface (e.g., onto thermoplastic material that is doped with a metal additive). The doped metal additive is subsequently activated by means of a laser. LDS enables the construction of antennas onto more complex three-dimensional (3D) geometries. For example, in various typical smartphones, wristwatch and other mobile device applications, the underlying device housing and/or other antenna components on which the antenna may be disposed, is manufactured using an LDS polymer using standard injection molding processes. A laser is then used to activate areas of the (thermoplastic) material that are then subsequently plated. Typically an electrolytic copper bath followed by successive additive layers such as nickel or gold are then added to complete the construction of the antenna.

Additionally, pad printing, conductive ink printing, FPC, sheet metal, PCB processes may be used consistent with the disclosure. It will be appreciated that various features of the present disclosure are advantageously not tied to any particular manufacturing technology, and hence can be broadly used with any number of the foregoing. While some technologies inherently have limitations on making e.g., 3D-formed radiators, and adjusting gaps between elements, the inventive antenna structure can be formed by using any sort of conductive materials and processes.

However, while the use of LDS is exemplary, other implementations may be used to manufacture the coupled antenna apparatus such as via the use of a flexible printed circuit board (PCB), sheet metal, printed radiators, etc. as noted above. However, the various design considerations above may be chosen consistent with, for example, maintaining a desired small form factor and/or other design requirements and attributes. For example, in one variant, the printing-based methods and apparatus described in co-owned and co-pending U.S. patent application Ser. No. 13/782,993 and entitled "DEPOSITION ANTENNA APPARATUS AND METHODS", filed Mar. 1, 2013, which claims the benefit of priority to U.S. Provisional Patent application Ser. No. 61/606,320 filed Mar. 2, 2012, 61/609, 868 filed Mar. 12, 2012, and 61/750,207 filed Jan. 8, 2013, each of the same title, and each of the foregoing incorporated herein by reference in its entirety, are used for deposition of the antenna radiator on the substrate. In one such variant, the antenna radiator includes a quarter-wave loop or wire-like structure printed onto the substrate using the printing process discussed therein.

The portable device illustrated in FIGS. 2A-5C (i.e. a wrist mountable watch, asset tracker, sports computer, etc. with GPS functionality) is placed in an enclosure 200, 300, 400, 500, configured to have a generally circular form. However, it is appreciated that while this device shown has a generally circular form factor, the present disclosure may be practiced with devices that possess other desirable form factors including, without limitation, square (such as that illustrated with respect to FIGS. 6A and 6B), rectangular, other polygonal, oval, irregular, etc. In addition, the enclosure is configured to receive a display cover (not shown) formed at least partly with a transparent material such as a transparent polymer, glass or other suitable transparent material. The enclosure is also configured to receive a coupled antenna apparatus, similar to that shown in FIG. 1. In the exemplary embodiments, the enclosure is formed from an injection molded polymer, such as polyethylene or ABS-PC. In one variant, the plastic material further has a metalized conductive layer (e.g., copper alloy) disposed on its surface. The metalized conductor layers generally form a coupled antenna apparatus as illustrated in FIG. 1.

Figure 2A:
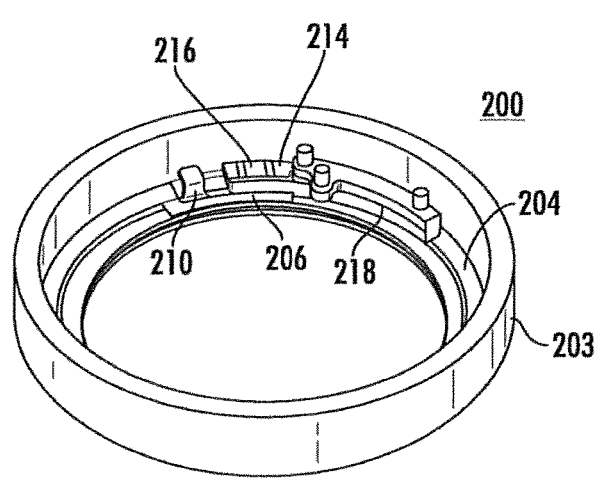
FIG. 2A is a perspective view of the underside of one embodiment of the coupled antenna apparatus of a radio device in accordance with the principles of the present disclosure.
Figure 2B:
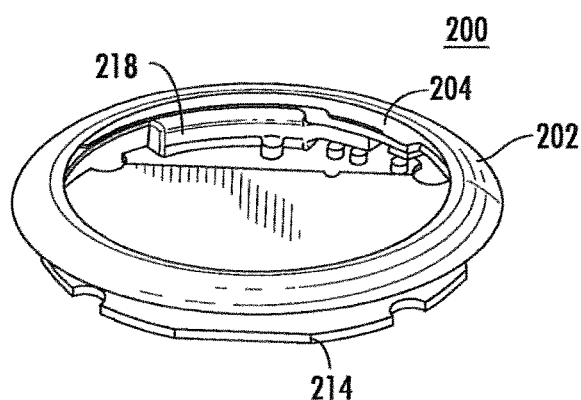
FIG. 2B is a perspective of the coupled antenna apparatus of FIG. 2A configured according to one embodiment of the present disclosure.
Figure 2C:
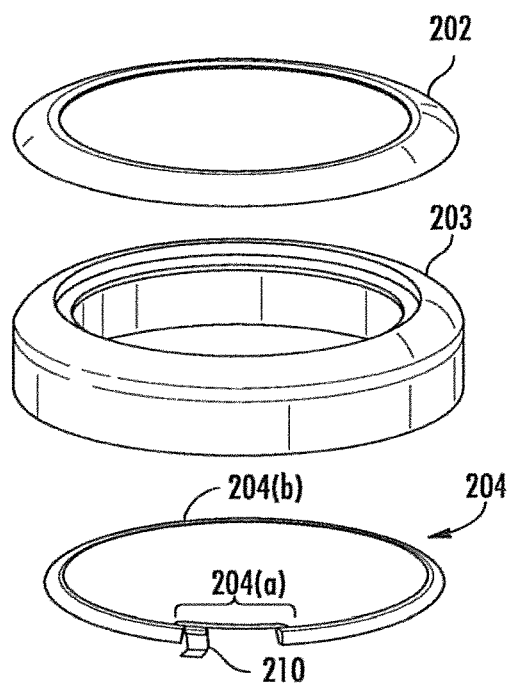
FIG. 2C is an exploded view of the coupled antenna apparatus of FIGS. 2A-2B detailing various components of the coupled antenna apparatus in accordance with the principles of the present disclosure.

Referring now to FIGS. 2A-2C, one embodiment of a coupled antenna apparatus 200 for use in a portable radio device in accordance with the principles of the present disclosure is shown. FIG. 2A illustrates the underside of the coupled antenna apparatus 200 illustrating the various connections made to a printed circuit board (219, FIGS. 2B and 2C). Specifically, FIG. 2A illustrates short circuit point 210 for the middle ring radiator element 204 as well as the short circuit point 216 and galvanic feed point 214 for the inner feed trace element 206. Both the inner feed trace element and middle ring radiator element are disposed internal to the front cover 203 of the illustrated embodiment for the coupled antenna apparatus for use with a portable radio device. The front cover 203 (see FIGS. 2A and 2C) is manufactured, according to a first embodiment of the disclosure, using a laser direct structuring ("LDS") polymer material that is subsequently doped and plated with an outer ring radiating element 202 (see FIGS. 2B-2C). The use of LDS technology is exemplary in that it allows complex (e.g. curved) metallic structures to be formed directly onto the underlying polymer material.

In addition, the middle ring radiator element 204 is disposed on the inside of the doped front cover 203 using LDS technology as well in an exemplary embodiment. The middle ring radiator element 204 is constructed into two (2) parts 204(a) and 204(b). In an exemplary implementation, element 204(a) is used to provide a favorable place for the ground contact (short circuit point) 210 to mate. The short circuit point 210 is disposed on one end of the first part 204(a) of middle ring radiator. Coupled antenna apparatus 200 further includes an LDS polymer feed frame 218 onto which an inside feed element 206 is subsequently constructed. The inside feed element comprises a galvanic feed point 216 as well as a short circuit point 214, both of which are configured to be coupled to a printed circuit board 219 at points 216' and 214', respectively (see FIG. 2C). The inside feed frame element is disposed adjacent to the middle radiator ring element part 204 such that coaxial feed point is at a distance 222 from the middle radiator element short circuit point 210. Short circuit points 210 of the middle radiator element and 214 of the inside feed element are configured to interface with the PCB 219 at points 210' and 214', respectively. A back cover 220 is positioned on the underside of the printed circuit board and forms the closed structure of the coupled antenna apparatus.

Figure 3A:
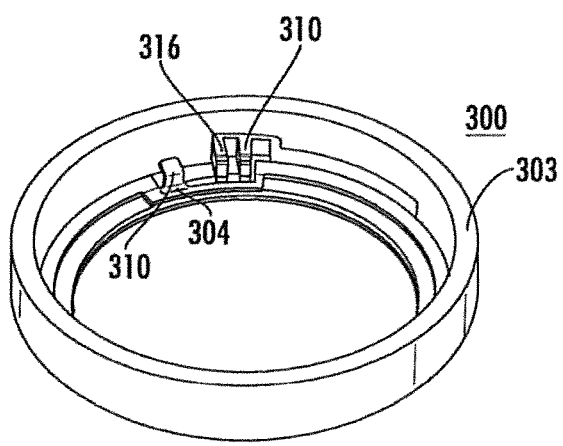
FIG. 3A is a perspective view of the underside of a second embodiment of a coupled antenna apparatus of a radio device in accordance with the principles of the present disclosure.
Figure 3B:
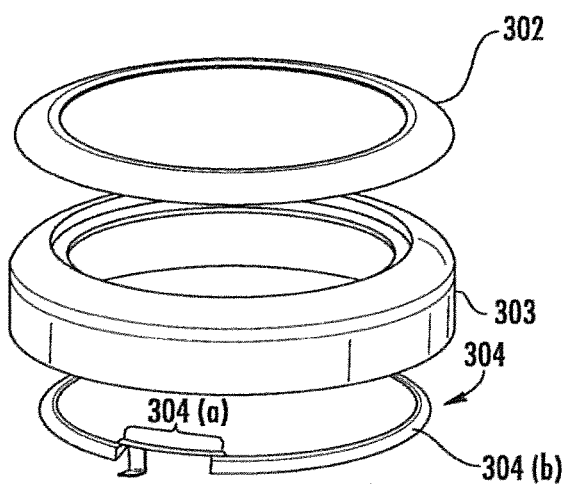
FIG. 3B is a perspective of the coupled antenna apparatus of FIG. 3A configured according to a second embodiment of the present disclosure.
Figure 3B:
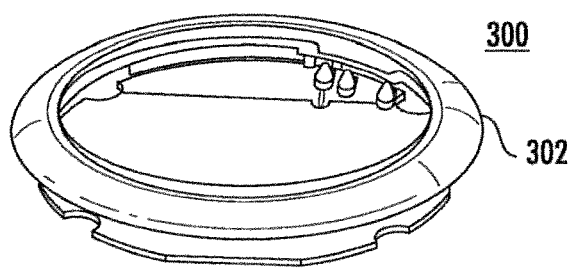
Figure 3C:
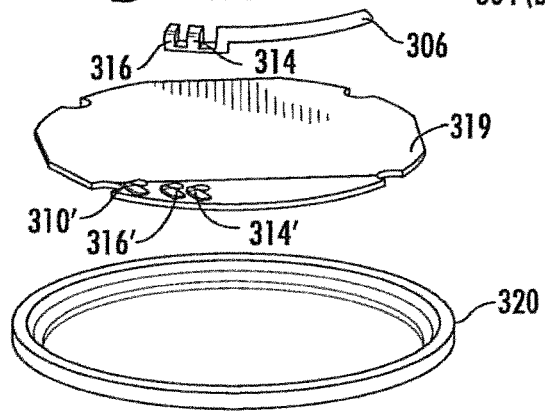
FIG. 3C is an exploded view of the coupled antenna apparatus of FIGS. 3A-3B detailing various components of a coupled antenna apparatus in accordance with the principles of the present disclosure.

Referring now to FIGS. 3A-3C, an alternative embodiment of a coupled antenna apparatus 300 for use in a portable radio device, in accordance with the principles of the present disclosure, is shown. FIG. 3A illustrates the underside of the coupled antenna apparatus 300 showing the various connections made to a printed circuit board (319, FIG. 3C). Specifically, FIG. 3A illustrates a short circuit point 310 for the middle ring radiator element 304 as well as the short circuit point 316, and a galvanic feed point 314 for the inner feed trace element 306. Both the inner feed trace element and middle ring radiator element are disposed internal to the front cover 303 of the illustrated embodiment for the coupled antenna apparatus for use with a portable radio device. The front cover 303 (see FIGS. 3A and 3C), is in an exemplary embodiment, manufactured using a laser direct structuring ("LDS") polymer material that is subsequently doped and plated with an outer ring radiating element 302 (see FIGS. 3B-3C). In addition, the middle ring radiator element 404 is disposed on the inside of the doped front cover 303 using LDS technology as well in an exemplary embodiment. The middle ring radiator element 304 is constructed into two (2) parts 304(a) and 304(b), and incorporates a short circuit point 310 that is disposed on one end of the first part 304(a) of middle ring radiator. The outer ring radiating element 302 and middle ring radiator 304 are similar in construction to the embodiment illustrated in FIGS. 2A-2C. However, the coupled antenna apparatus 300 differs from the embodiment of FIGS. 2A-2C in that an inside feed element 306 is subsequently constructed directly onto the inside of front cover 303, rather than being formed on a separate feed frame. The inside feed element comprises a galvanic feed point 316 as well as a short circuit point 314, both of which are configured to be coupled to a printed circuit board 319 at points 316' and 314', respectively (see FIG. 3C). A back cover 320 is positioned on the underside of the printed circuit board and forms the closed structure of the coupled antenna apparatus.

Figure 4A:
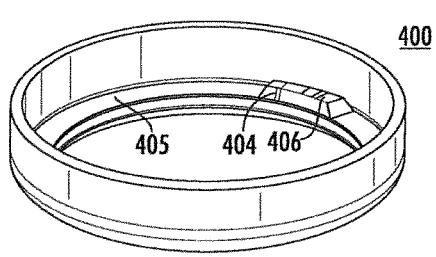
FIG. 4A is a perspective view of the underside of a third embodiment of a coupled antenna apparatus of a radio device in accordance with the principles of the present disclosure.
Figure 4B:
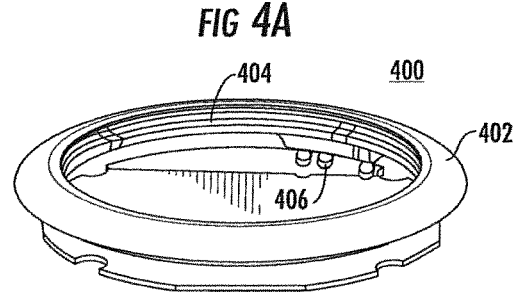
FIG. 4B is a perspective of the coupled antenna apparatus of FIG. 4A configured according to a third embodiment of the present disclosure.
Figure 4C:
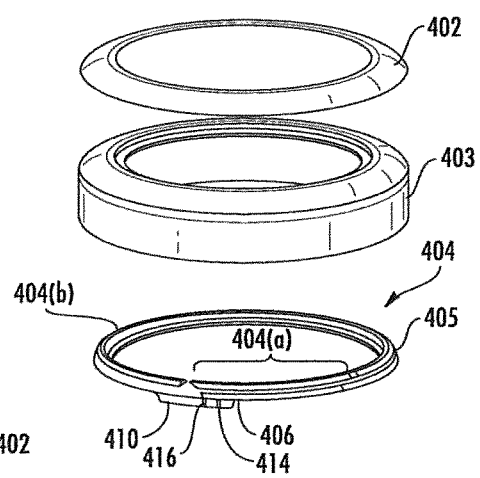
FIG. 4C is an exploded view of the coupled antenna apparatus of FIGS. 4A-4B detailing various components of a coupled antenna apparatus in accordance with the principles of the present disclosure.
Figure 4C:
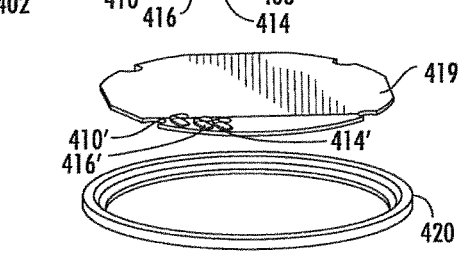

Referring now to FIGS. 4A-4C, yet another alternative embodiment of a coupled antenna apparatus 400 for use in a portable radio device, in accordance with the principles of the present disclosure, is shown. In the illustrated embodiment of FIGS. 4A-4C, the front cover 403 is manufactured from a non-LDS polymer, such as ABS-PC, or Polycarbonate. Rather, a middle ring frame 405 is separately provided such that the middle ring radiator element 404 and the inside feed element 406 are constructed onto the middle ring frame 405. The middle ring frame is advantageously comprised of an LDS polymer, with the middle ring radiator element and inside feed element being plated onto the surface of the middle ring frame. In addition, the outer ring radiating element 402 comprises a stamped metallic ring formed from e.g., stainless steel, aluminum or other corrosion resistant material (if exposed environmental stress without any additional protective coating). The selected material ideally should have adequate RF conductivity. Plated metals can be also used, for example nickel-gold plating, etc. or other well-known RF materials that are disposed onto the front cover 403. The middle ring frame includes three (3) terminals that are configured to be coupled electrically to the printed circuit board 419. These include a short circuit point 410 for the middle ring radiator element 404, as well as the short circuit point 416 and galvanic feed point 414 for the inner feed trace element 406. The short circuit point 410 for the middle ring radiator is configured to couple with the printed circuit board 419 at pad 410', while the short circuit point 416 and galvanic feed point 414 are configured to couple with the printed circuit board 419 at pads 416' and 414', respectively. The middle ring radiator element 404 is constructed into two (2) parts 404(*a*) and 404(*b*), and incorporates a short circuit point 410 that is disposed on one end of the first part 404(*a*) of middle ring radiator. The part which has the ground contact 410 is in the exemplary embodiment used as a coupling element, and rest of the middle ring element 404 is left "floating" (i.e., no RF contacts) and does not contribute to the radiation or coupling. A back cover 420 is subsequently positioned on the underside of the printed circuit board and forms the closed structure of the coupled antenna apparatus 400.

While the aforementioned embodiments generally comprise a single coupled antenna apparatus disposed within a host device enclosure, it will also be appreciated that in some embodiments, additional antenna elements in addition to, for example, the exemplary coupled antenna apparatus 100 of FIG. 1 can be disposed within the host device. These other antenna elements can designed to receive other types of wireless signals, such as and without limitation e.g., Bluetooth®, Bluetooth Low Energy (BLE), 802.11 (Wi-Fi), wireless Universal Serial Bus (USB), AM/FM radio, International, Scientific, Medical (ISM) band (e.g., ISM-868, ISM-915, etc.), ZigBee®, etc., so as to expand the functionality of the portable device, yet maintain a spatially compact form factor. An exemplary embodiment comprising more than one coupled antenna assembly is shown in FIGS. 5A-5C.

Figure 5A:
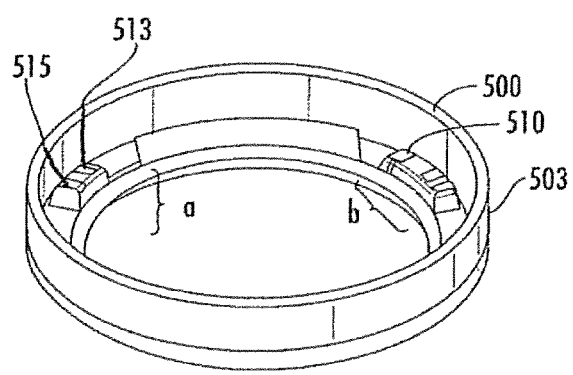
FIG. 5A is a perspective view of the underside of a fourth embodiment of a coupled antenna apparatus of a radio device in accordance with the principles of the present disclosure.
Figure 5B:
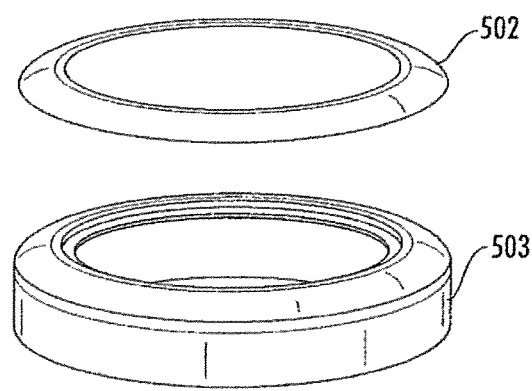
FIG. 5B is a perspective of the coupled antenna apparatus of FIG. 5A configured according to a fourth embodiment of the present disclosure.
Figure 5B:
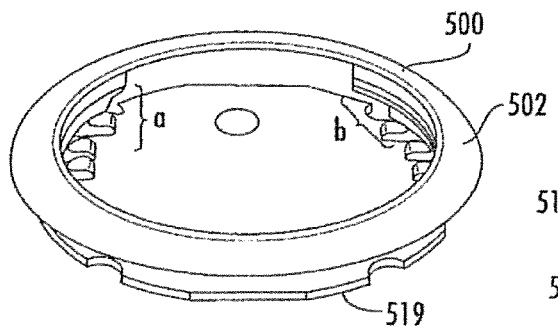
Figure 5C:
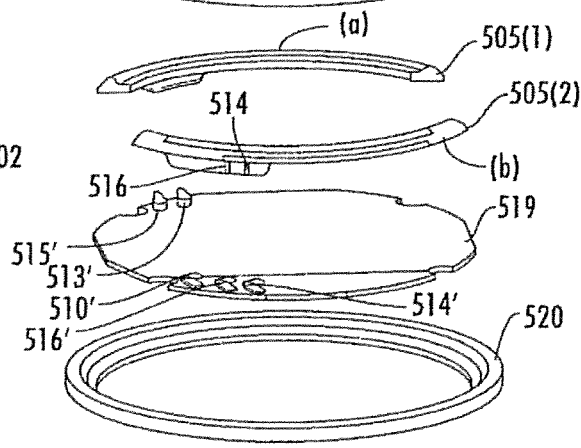
FIG. 5C is an exploded view of the coupled antenna apparatus of FIGS. 5A-5B detailing various components of a coupled antenna apparatus in accordance with the principles of the present disclosure.

In the illustrated embodiment of FIGS. 5A-5C, similar to that shown in FIGS. 4A-4C, the front cover 503 is manufactured from a non-LDS polymer, such as for example ABS-PC, or Polycarbonate. Two middle ring frame elements 505 are separately provided such that the middle ring radiator element 504 and the inside feed element 506 are constructed onto the pair of middle ring frames 505. The exemplary middle ring frames are advantageously comprised of an LDS polymer, with the middle ring radiator element and inside feed element being plated onto the surface of the middle ring frame elements. In addition, the outer ring radiating element 502 comprises a stamped metallic ring that is disposed onto the front cover 503. The middle ring frame includes five (5) terminals that are configured to be coupled electrically to the printed circuit board 519. These include short circuit points 510, 513, 515 for the middle ring radiator elements 504 as well as the short circuit point 516 and galvanic feed point 514 for the inner feed trace element 506. The short circuit points 510, 513, 515 for the middle ring radiator is configured to couple with the printed circuit board 519 at pad locations 510', 513', 515', respectively, while the short circuit point 516 and galvanic feed point 514 are configured to couple with the printed circuit board 519 at pads 516' and 514', respectively. The middle ring radiator element 504 is constructed into two (2) parts 504(*a*) and 504(*b*) and incorporates a short circuit point 510 that is disposed on one end of the first part 504(*a*) of middle ring radiator. In the exemplary embodiment, part 504 *b* provides the middle ring for GPS frequency excitation, and part 504 *a* provides the middle ring excitation for another frequency (e.g., 2.4 GHz). Both middle ring elements are coupled to the same top (outer) ring radiator, making the complete structure operate in a dual-band mode. A back cover 520 is subsequently positioned on the underside of the printed circuit board and forms the closed structure of the coupled antenna apparatus 500.

The coupled antenna apparatus 500 illustrated comprises two antenna assemblies "a" and "b" such that "a" comprises middle radiator element 504(1) and inside feed element 506(1), and "b" comprises middle radiator element 504(2) and inside feed element 506(2), both "a" and "b" having a common outer ring element 502. The two antenna assemblies may operate in the same frequency band, or alternatively, in different frequency bands. For example, antenna assembly "a" may be configured to operate in a Wi-Fi frequency band around 2.4 GHz, while antenna assembly may be configured to operate in the GNSS frequency range to provide GPS functionality. The operating frequency selection is exemplary and may be changed for different applications according to the principles of the present disclosure.

Moreover, the axial ratio (AR) of the antenna apparatus of the present disclosure can be affected when antenna feed impedance is tuned in conjunction with user body tissue loading (see prior discussion of impedance tuning based on ground and feed trace locations). Axial ratio (AR) is an important parameter to define performance of circularly polarized antennas; an optimal axial ratio is one (1), which correlates to a condition where the amplitude of a rotating signal is equal in all phases. A fully linearly polarized antenna would have infinite axial ratio, meaning that its signal amplitude is reduced to zero when phase is rotated 90 degrees. If an optimal circular polarized signal is received with a fully linearly polarized antenna, 3 dB signal loss occurs due to polarization mismatch. In other words, 50% of the incident signal is lost. In practice, it is very difficult to achieve optimal circular polarization (AR=1) due to asymmetries on mechanical constructions, etc. Conventionally used ceramic GPS patch antennas typically have an axial ratio of 1 to 3 dB when used in actual implementations. This is considered to be "industry standard", and has a sufficient performance level.

Furthermore, it will also be appreciated that the device 200 can further comprise a display device, e.g., liquid crystal display (LCD), light emitting diodes (LED) or organic LED (OLED), TFT (thin film transistor), etc., that is used to display desired information to the user. Moreover, the host device can further comprise a touch screen input and display device (e.g., capacitive or resistive) or the type well known in the electronic arts, thereby providing user touch input capability as well as traditional display functionality.

Figure 6A:
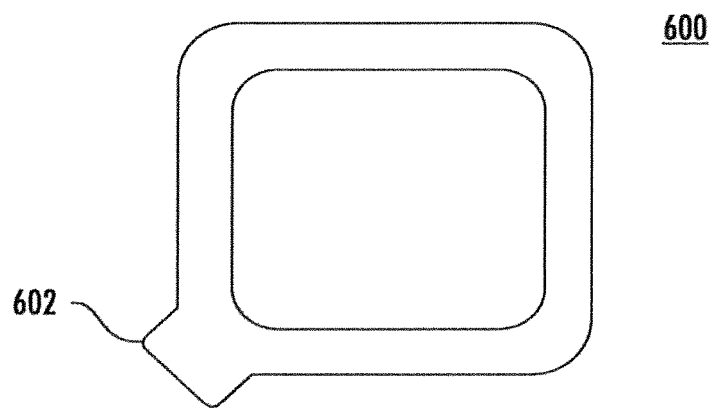
FIG. 6A is a top side view of an asymmetrical outer ring element useful in the coupled antenna apparatus of FIGS. 2A-5C in accordance with the principles of the present disclosure.
Figure 6B:
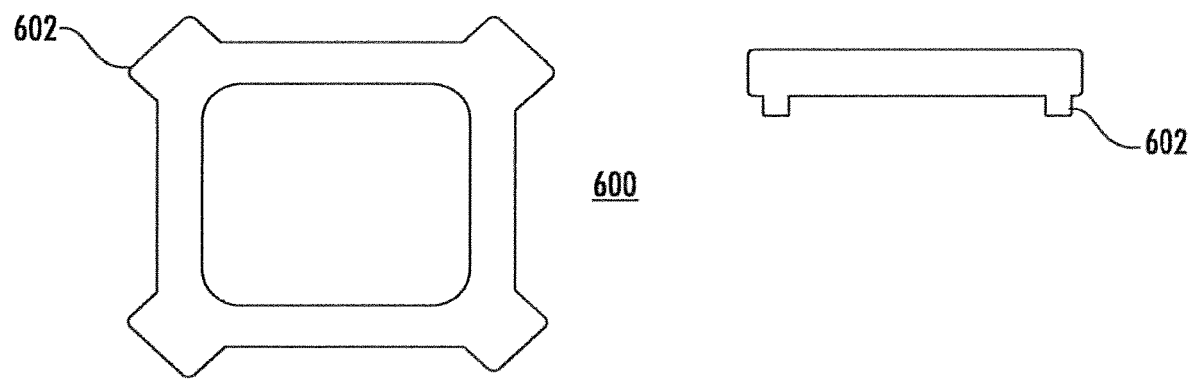
FIG. 6B is a top side view of a symmetrical outer ring element useful in the coupled antenna apparatus of FIGS. 2A-5C in accordance with the principles of the present disclosure.

Referring now to FIGS. 6A and 6B, an alternative configuration of an outer ring element 600 useful in combination with the coupled antenna apparatus 100, 200, 300, 400, 500 illustrated in, for example, FIGS. 2A-5C is shown and described in detail. In one embodiment, a quarter-wave antenna is used for the feed element which is coupled to the upper cover which includes the outer ring element 600. This upper cover can be made from an LDS polymer with the outer ring element 600 deposited thereon, or alternatively, can be made from a fully metallic bezel with or without an underlying polymer base material. The illustrated outer ring element 600 includes a generally rectangular profile with the addition of one or more extra conductive portions 602 useful in optimizing frequency and RHCP and LHCP gain. However, it is appreciated that other outer ring element shapes (such as circular or other polygonal shapes) could readily be substituted if desired. Moreover, while the outer ring element 600 structure of FIGS. 6A and 6B are illustrated using relatively simple geometries, it is appreciated that more complex three-dimensional (3D) structures can be quite easily achieved using the various methodologies described previously herein.

As illustrated in FIGS. 2A-5C, antenna optimization is typically performed by varying the parameters of the inside antenna elements; however, such an optimization makes it difficult to, for example, optimize all of the GPS/GLONASS antenna parameters such as AR/RHCP/LHCP. By varying the outer ring element 600 structure, various electrical parameters can now be optimized. Specifically, by varying the geometry of the outer ring element 600, the coupled antenna apparatus can now optimize circular polarization including, for example, increasing RHCP gain, decreasing LHCP gain and having a good axial ratio. For example, if the outer ring element 600 is made asymmetrical (such as that shown in FIG. 6A), the coupled antenna apparatus electrical parameters can be adjusted so as to optimize RHCP/LHCP/AR gain. Moreover, in both asymmetrical and symmetrical designs (such as that shown in FIGS. 6A and 6B), the extra metal length, width, thickness and shape of the outer ring element 600 can also be manipulated in order to optimize the RHCP/LHCP/AR and resonant parameters as discussed below with regards to FIGS. 10-13. By varying the geometrical structure of the outer ring element, various antenna performance parameters can be optimized resulting in, for example, a stronger satellite signal receiver.

Performance

Figure 7:
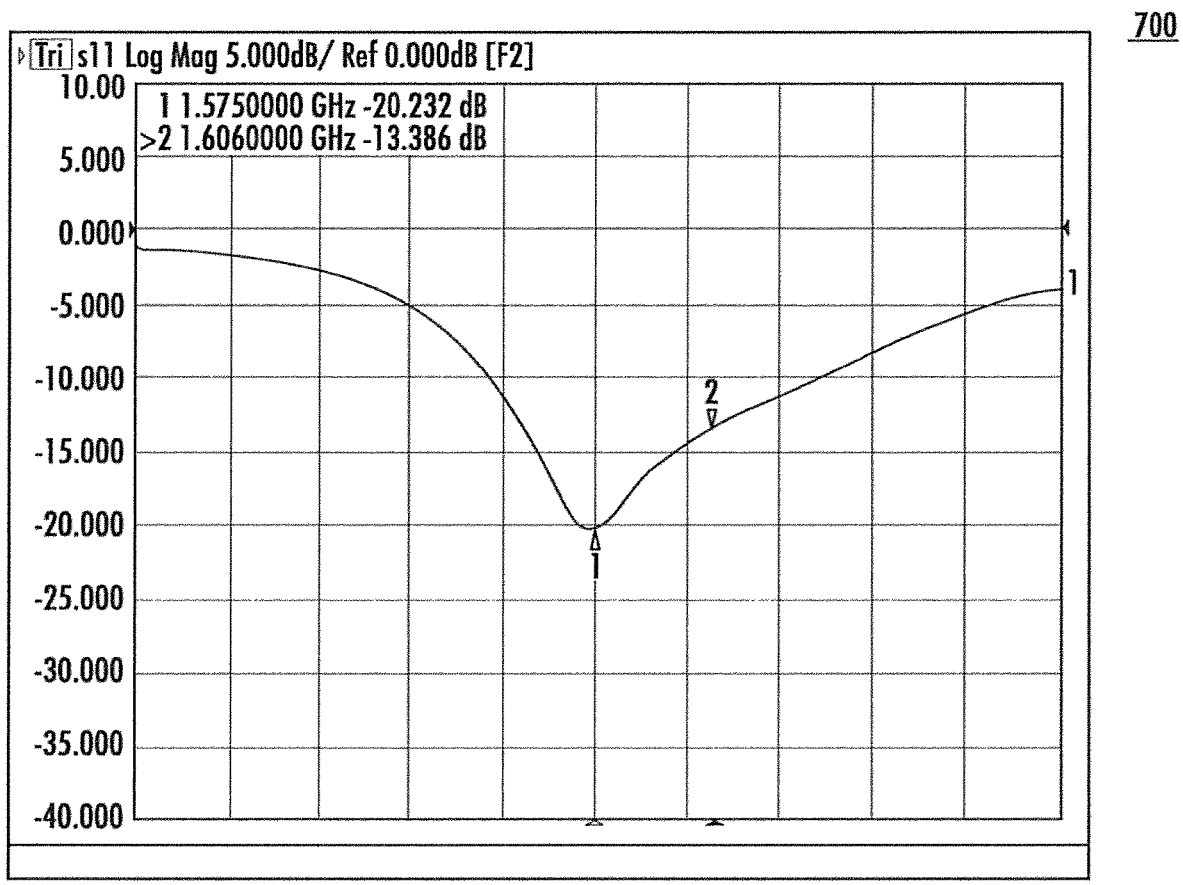
FIG. 7 is a plot of return loss as a function of frequency utilizing an exemplary coupled antenna apparatus embodiment constructed in accordance with the principles of the present disclosure.
Figure 8:
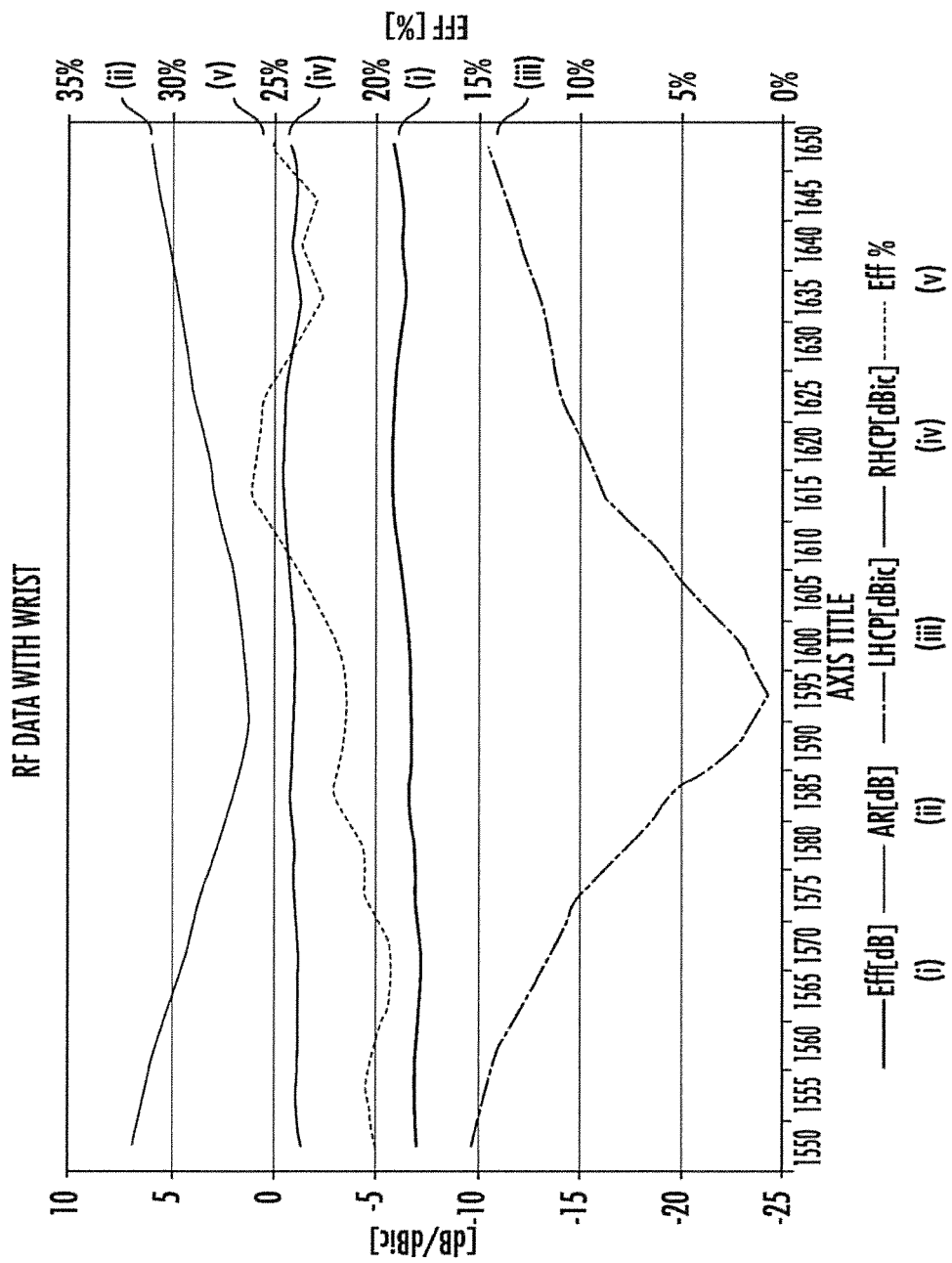
FIG. 8 is a plot illustrating (i) efficiency (dB); (ii) axis ratio (dB); (iii) right hand circular polarized (RHCP) signal gain; (iv) left hand circular polarized (LHCP) signal gain; and (v) efficiency (%) as a function of frequency for an exemplary coupled antenna apparatus constructed in accordance with the principles of the present disclosure.
Figure 9:
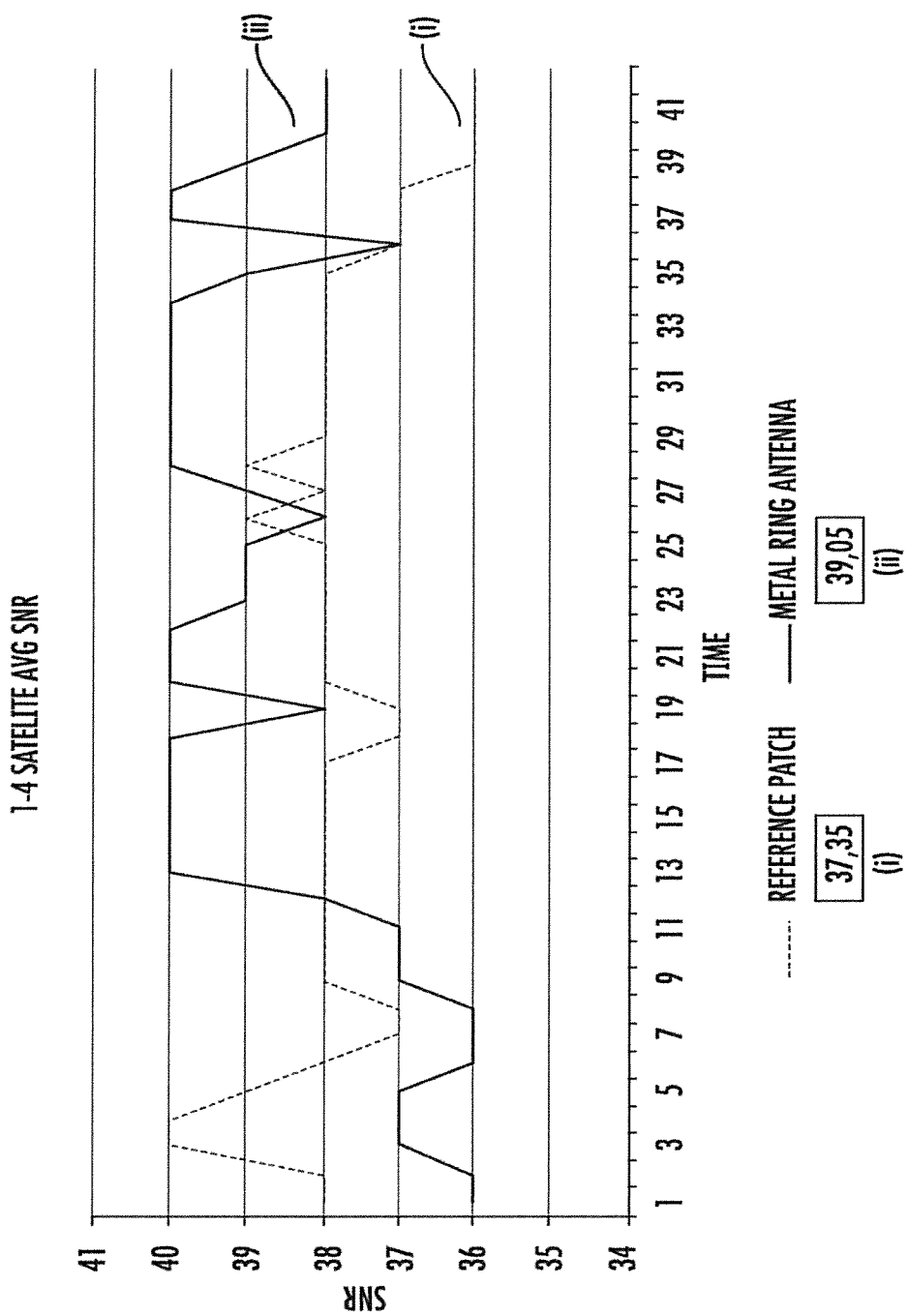
FIG. 9 is a plot illustrating measured SNR (signal to noise ratio) for an exemplary coupled antenna apparatus constructed in accordance with the principles of the present disclosure.

Referring now to FIGS. 7-9, performance results obtained during testing by the Assignee hereof of an exemplary coupled antenna apparatus constructed according to the present disclosure, such as that illustrated in FIGS. 2A-2C, are presented.

FIG. 7 illustrates an exemplary plot of return loss S11 (in dB) as a function of frequency, measured, while connected to a simulated wrist, utilizing an exemplary antenna apparatus constructed in accordance with the embodiment depicted in FIGS. 2A-2C. Exemplary data for the frequency band show a characteristic resonance structure at 1.575 GHz, with an intermediate frequency bandwidth (IFBW) of 70 kHz, thus producing an approximate frequency operating range of 1540-1610 MHz. More specifically, the return loss at 1.575 GHz is approximately −20.2 dB (decibels).

FIG. 8 presents data anecdotal performance (measured at the wrist) produced by a test setup emulating the exemplary antenna embodiment of FIGS. 2A-2C. More specifically, the data at FIG. 8, line (i) demonstrates that the current antenna apparatus positioned within the portable device and on the wrist of the user achieves an efficiency of approximately −7 dB to −6 dB. Furthermore, FIG. 8, line (v) demonstrates that the current antenna apparatus positioned within the portable device and on the wrist of the user achieves an efficiency of greater than 20% over the exemplary frequency range between 1550 and 1605 MHz with the highest efficiency (about 27%) occurring at approximately 1617 MHz. The antenna efficiency (in percent) is defined as the percentage of a ratio of radiated and input power:

$$\text{AntennaEfficiency \%} = (\text{Radiated Power}/\text{Input Power}) \times 100\% \qquad \text{Eqn. (1)}$$

An efficiency of zero (0) dB corresponds to an ideal theoretical radiator, wherein all of the input power is radiated in the form of electromagnetic energy. Furthermore, according to reciprocity, the efficiency when used as a receive antenna is identical to the efficiency described in Equation 1. Thus, the transmit antenna efficiency is indicative of the expected sensitivity of the antenna operating in a receive mode.

The exemplary antenna of FIGS. 2A-2C is configured to operate in an exemplary frequency band from 1550 MHz to 1650 MHz. This capability advantageously allows operation of a portable computing device with a single antenna over several mobile frequency bands such as the GPS and GLONASS frequency bands. However, as persons skilled in the art will appreciate, the frequency band composition given above may be modified as required by the particular application(s) desired, and additional bands may be supported/used as well.

FIGS. 8(iii) and 8(iv) illustrate exemplary LHCP and RHCP gain data for the test setup emulating the exemplary antenna of FIGS. 2A-2C, as shown herein. As illustrated, the RHCP gain (line iv) is appreciably higher than the LHCP gain (line iii). Accordingly, in satellite navigation system applications where signals would be transmitted downward to a user from orbiting satellites, the LHCP gain is suppressed while still allowing for dominating RHCP gain. Thus, by suppressing the LHCP gain compared to the RHCP gain, the receiver sensitivity to RHCP signals does not suffer from a high LHCP gain, thereby increasing positional accuracy in the exemplary case of satellite navigation applications.

FIG. 8, line (ii) illustrates the free-space test data of axial ratio (to zenith) in dB. The antenna apparatus 100 of device 200 has AR of 2 dB-7 dB in 1550-165 MHz. On the band of interest (1575-1610), AR is 2-3 dB, which is not perfect (perfect is 0 dB) circular polarization, but a typical value that is commonly accepted by industry in the context of real-world implementations on actual host units. Other implementations of the exemplary antenna of the disclosure have achieved a 1 db level during testing by the Assignee hereof.

FIG. 9 illustrate active test data relating to measured SNR (signal to noise ratio) for a prior art patch antenna, and an embodiment of the coupled antenna apparatus measured from an actual satellite (constellation). As illustrated, the data obtained from the inventive antenna apparatus is generally better than the reference (patch) antenna in SNR level.

Figure 10:
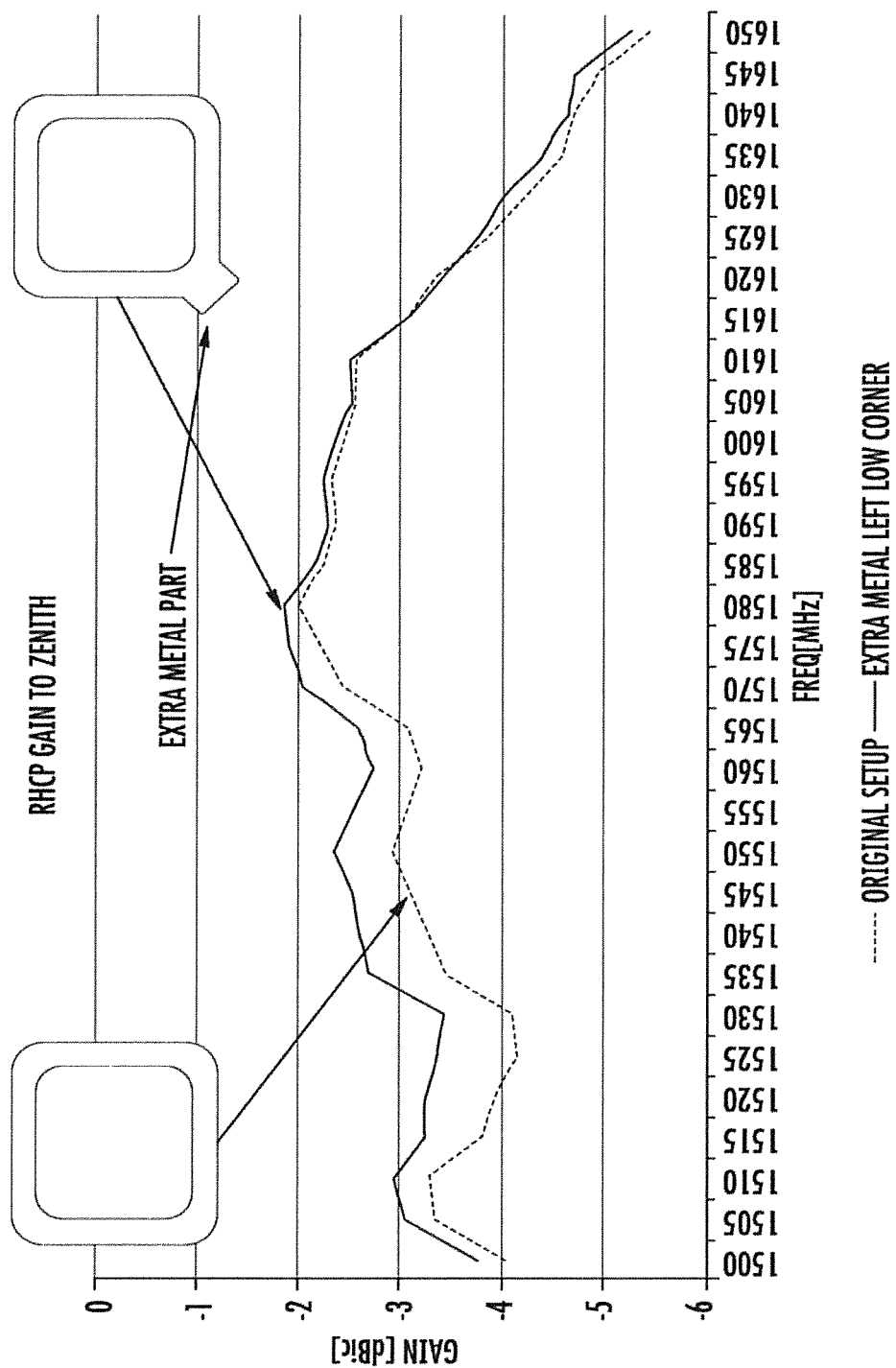
FIG. 10 is a plot illustrating RHCP signal gain as a function of frequency for the asymmetrical outer ring element of FIG. 6A utilized in conjunction with the coupled antenna apparatus of FIGS. 2A-5C manufactured in accordance with the principles of the present disclosure.
Figure 11:
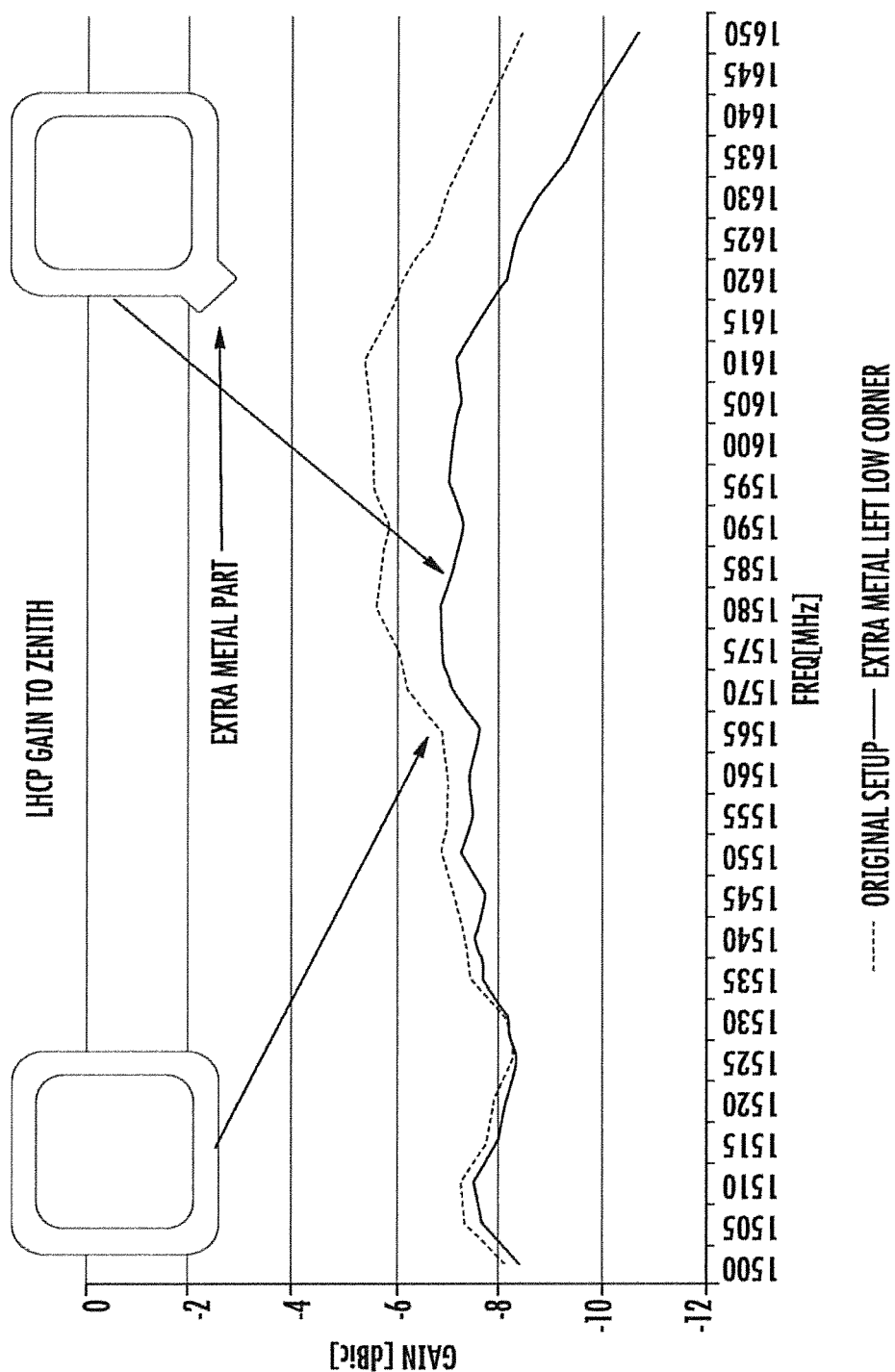
FIG. 11 is a plot illustrating LHCP signal gain as a function of frequency for the asymmetrical outer ring element of FIG. 6A utilized in conjunction with the coupled antenna apparatus of FIGS. 2A-5C manufactured in accordance with the principles of the present disclosure.

FIGS. 10 and 11 illustrate exemplary RHCP and LHCP gain data for the test setup emulating the exemplary antenna of, for example, FIGS. 2A-2C utilized in conjunction with the asymmetrical outer ring element of FIG. 6A, as shown herein. As illustrated, the RHCP gain (FIG. 10) is appreciably higher than the LHCP gain (FIG. 11) for the asymmetrical outer ring element of FIG. 6A as compared with an outer ring element that does not have additional conductive portions added to the structure. Accordingly, in satellite navigation system applications where signals would be transmitted downward to a user from orbiting satellites, the LHCP gain is suppressed while still allowing for dominating RHCP gain. Thus, by suppressing the LHCP gain compared to the RHCP gain, the receiver sensitivity to RHCP signals does not suffer from a high LHCP gain, thereby increasing positional accuracy in the exemplary case of satellite navigation applications.

Figure 12:
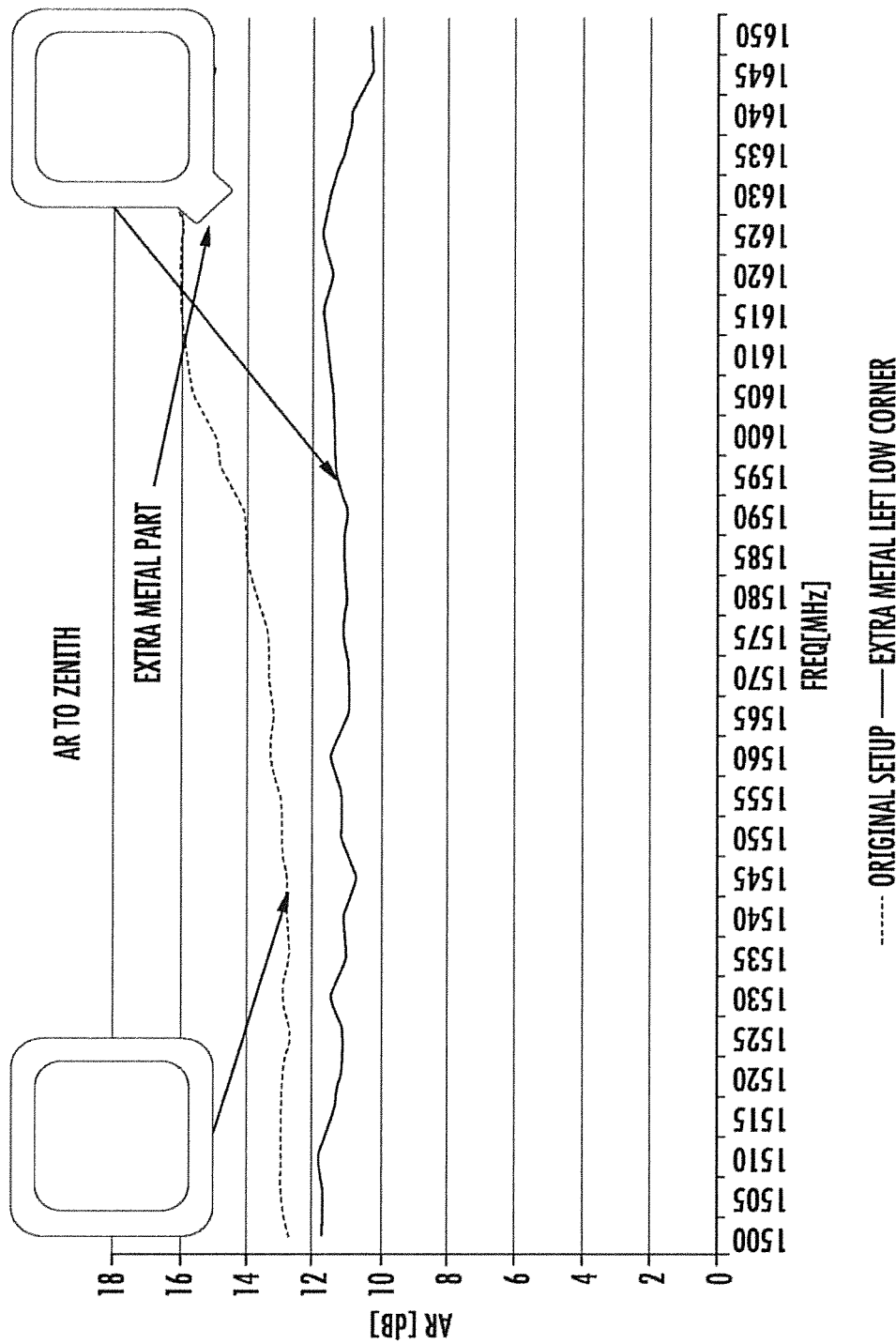
FIG. 12 is a plot illustrating axial ratio (AR) gain as a function of frequency for the asymmetrical outer ring element of FIG. 6A utilized in conjunction with the coupled antenna apparatus of FIGS. 2A-5C manufactured in accordance with the principles of the present disclosure.

FIG. 12 illustrates the free-space test data of axial ratio (to zenith) in dB of the exemplary antenna of, for example, FIGS. 2A-2C utilized in conjunction with the asymmetrical outer ring element of FIG. 6A. The coupled antenna apparatus utilizing the asymmetrical outer ring element has an AR of 10 dB-12 dB in the 1500-1650 MHz frequency range while the coupled antenna apparatus that does not utilize the asymmetrical outer ring element has an AR of 13 dB-16 dB in the 1500-1650 MHz frequency range.

Figure 13:
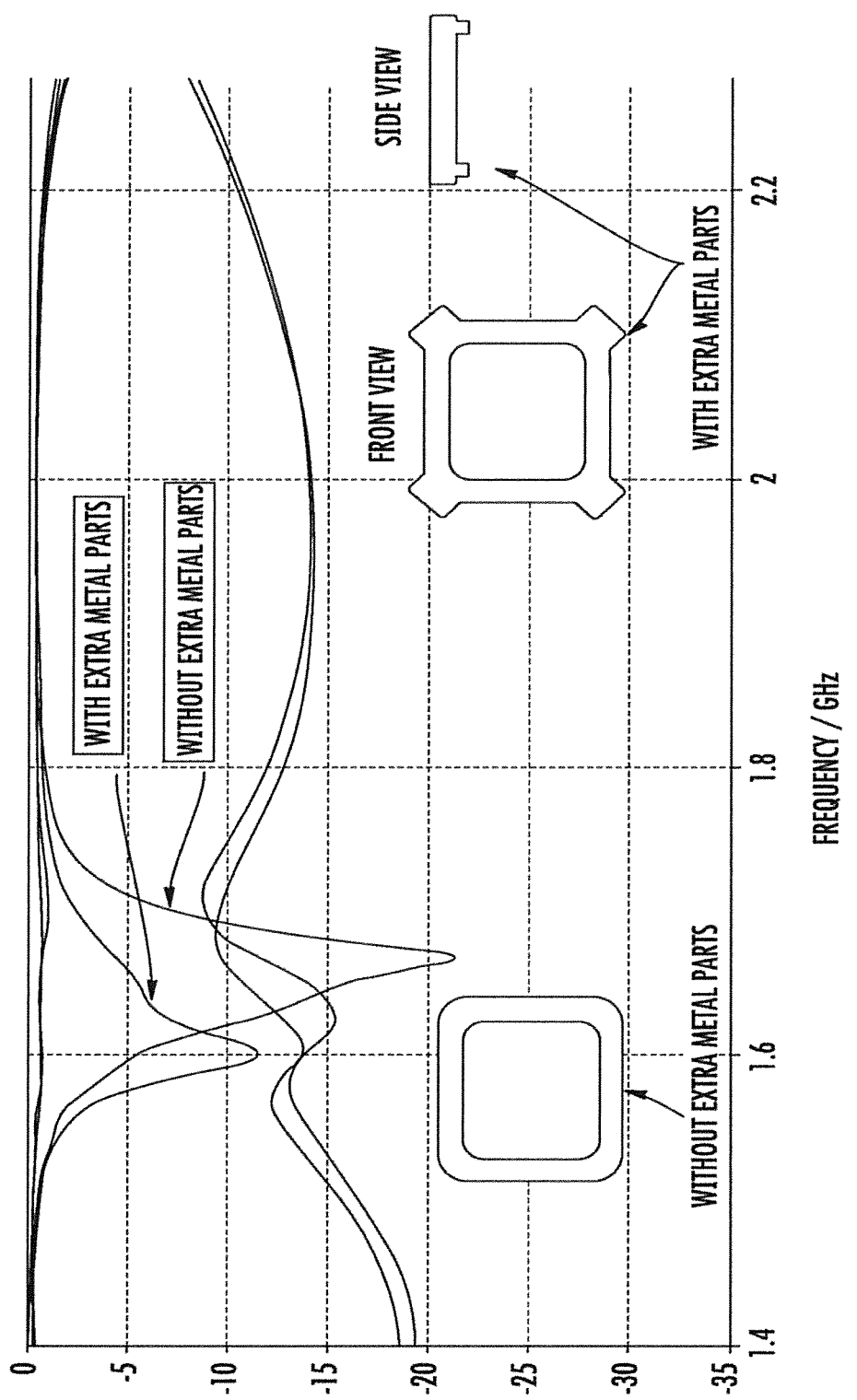
FIG. 13 is a plot of return loss as a function of frequency for the symmetrical outer ring element of FIG. 6B utilized in conjunction with the coupled antenna apparatus of FIGS. 2A-5C manufactured in accordance with the principles of the present disclosure.

FIG. 13 illustrates an exemplary plot of return loss S11 (in dB) as a function of frequency, measured, while connected to a simulated wrist, utilizing a symmetrical outer ring element (FIG. 6B) in conjunction with the coupled antenna apparatus embodiment depicted in, for example, FIGS. 2A-2C. Exemplary data for the frequency band show that the characteristic resonance structure can be manipulated through the addition of additional conductive portions to the outer ring element. For example, the characteristic resonance structure utilizing the symmetrical outer ring element is present at approximately 1.600 GHz while characteristic resonance structure for a coupled antenna apparatus without the additional conductive portions is present at approximately 1.650 GHz. While the results shown is exemplary, it is appreciated that characteristic resonance frequency can be manipulated via the addition of conductive portions in any of the X, Y, and Z directions depending upon what electrical parameters want to be tuned.

FIG. 14 shows an additional embodiment of a coupled antenna apparatus including a transient voltage suppressor (TVS). FIG. 14 is similar to FIG. 1 described above. In certain situations it is desirable to have the outer radiator element 132 as a portion of the antenna. The outer radiator element 132 can share some or all of the properties as the outer element 102 as discussed above. However, as the outer radiator element 132 is a portion of the antenna it cannot readily be grounded in the antenna configuration of FIG. 1. Therefore, a TVS diode 130 is electrically connected to the outer radiator element 132. An example schematic thereof is shown in FIG. 14. The TVS 130 therefore connects the outer radiator element 132 to a ground when there is a big enough potential or voltage in the outer radiator element 132. As such, the TVS diode protects the electronics within a device from being harmed from, for example, an electric spark outside of the device.

In the example of FIG. 14, the first part 104(a) of the middle radiator element, and the inner feed element 106 are connected to the ground. Additionally, they are inside the electrostatic discharge (ESD) protection provided by the outer radiator element 132 connected to the TVS diode. Without TVS grounding a large enough potential will in practice find its way through the outermost conductive portion of a device and damage internal electronics. One particular problem in smart watches and mobile devices is that large potentials will pass through display lines and connections in and damage display drivers.

FIGS. 15A-15C show an example, similar to that of FIG. 2, of a wrist-wearable electronic device wherein the bezel includes an outer radiator element 232 which is electrically coupled to an ESD circuit 230. As shown in FIG. 15C, the ESD circuit 230 can be located on the printed circuit board 219. However, the ESD circuit 230 could be located in or on another portion of the electronic device. Furthermore, the ESD circuit 230 can be electrically coupled to the outer radiator element 232 by, for example, a pogo pin. The ESD circuit 230 may consist of a low capacitance TVS diode according to FIG. 14, or of a LC circuit according to FIG. 16A, which is discussed below.

The outer radiator element can typically be ungrounded. The coupled antenna apparatus can have an ESD circuit consisting of an LC circuit which is electrically coupled to the outer radiator element. The LC circuit can be, for example, a coil L which is designed to resonate with its own parasitic capacitance at the same or approximately the same frequency as the received antenna signal. In such an embodiment, no external capacitor C is needed.

FIG. 16A shows an embodiment of an inventive coupled antenna apparatus including a transient voltage suppressor circuit 134. FIG. 16A is similar to FIGS. 1 and 14 described above. In certain situations it is desirable to have the outer radiator element 132 as a portion of the antenna. The outer radiator element 132 can share some or all of the properties as the outer element 102 as discussed above. However, as the outer radiator element 132 is a portion of the antenna it cannot readily be grounded in the antenna configuration of FIG. 1. Therefore, an LC circuit 134 is electrically connected to the outer radiator element 132. An example thereof is shown in FIG. 16A. The LC circuit 134 is closed, i.e. connects the outer radiator element 132 to ground at low frequencies and DC Direct Current). The value of the impedance of the LC the circuit is thus selected to allow electrostatic discharges to flow through it. The LC circuit 134 protects the electronics within a device from being harmed from, for example, an electric spark outside of the device.

At its resonant frequency, the LC 134 circuit makes a stopband and acts like an open circuit. The values of the L and C components are chosen for the circuit to resonate at the antenna's working frequency.

In the example of FIG. 16A, the first part 104(a) of the middle radiator element, and the inner feed element 106 are connected to the ground. Additionally electrostatic discharge (ESD) protection is provided by the outer radiator element 132 connected to the LC circuit 134. Without such a high-impedance grounding a large enough potential will in practice find its way through the outermost conductive portion of a device and damage internal electronics. One particular problem in smart watches and mobile devices is that large potentials will pass through display lines and connections in and damage display drivers.

According to certain examples, a fixed or variable capacitor C, or one or more switchable capacitors C1, C2 (see FIG. 16B) may be added in parallel to the coil L, in order to make the LC circuit 134 tunable. By tuning a variable capacitor C, and/or by switching capacitors C1 and C2 with suitably selected capacitances on and/or off, the LC circuit 134 or 134a can be tuned to different frequencies received by the antenna, such as to the frequencies of GPS, Glonass and Galileo navigation systems. Also other wireless systems may be interfaced with the inventive device, such as Bluetooth or WiFi, which frequencies may be received and the LC circuit 134 or 134a tuned to resonate on such frequencies as well, thus providing optimization of the antenna performance in a variety of systems. Surprisingly, LC circuits 134 or 134a provides ESD protection with a very small negative impact on antenna performance.

A bezel, for example for a wrist-wearable electronic device, can have an inner and an outer surface. All or a portion of the outer surface of the bezel can be an outer radiator element. Furthermore, one or more additional radiator elements can be located, housed and/or supported by the inner surface of the bezel. According to certain examples, one or more of the additional radiator elements are electrically isolated from, but mechanically connected to the inner surface of the bezel.

As described above, a coupled antenna apparatus can comprise a bezel which includes an outer radiator element. The outer radiator element forms a part of the antenna structure. The outer radiator element can be, for example, a section and/or sector of the bezel. The outer radiator element can have a closed loop structure and can even be the entire bezel. In examples where the bezel is metallic, the outer radiator element can be an integral portion of the bezel. The outer radiator element can also be a separate portion of the bezel which is combined with one or more other portions to form a bezel.

Numerous types of electronic devices can include a coupled antenna apparatus as described herein. One example is a wrist-wearable electronic device having an outer housing which includes one or more portions. At least one of the portions of the housing can be a bezel. According to certain examples the outer housing of the device includes a bezel, in accordance with any bezel discussed above, and a body. The body and/or the bezel can contain a plurality of electrical components. An outer portion of the bezel can contain a metallic portion which is, or acts as an outer radiator element. Said outer radiator element can be generally ungrounded. However, said outer radiator element can be electrically coupled, for example by a pogo pin, to a TVS device housed within the outer housing, to protect at least some of the plurality of internal electrical components from large potentials which the outer radiator element may be thereby exposed to.

Furthermore, according to certain examples, an electronic device may further include at least one screw. The screw may be primarily for mechanically coupling the bezel to the body of the outer housing, and/or to one or more other portions of the device. The screw may be electrically conductive, e.g. metallic, and therefore in electrical contact with a portion of the bezel and/or outer radiator element. Thus, the screw can form an additional conductive portion of the outer radiator element. In certain embodiments the screw may electrically ground at least a portion of the bezel. Furthermore, other connection means besides a screw but having similar electro-mechanical properties may be used in place of an actual screw.

Figure 17:
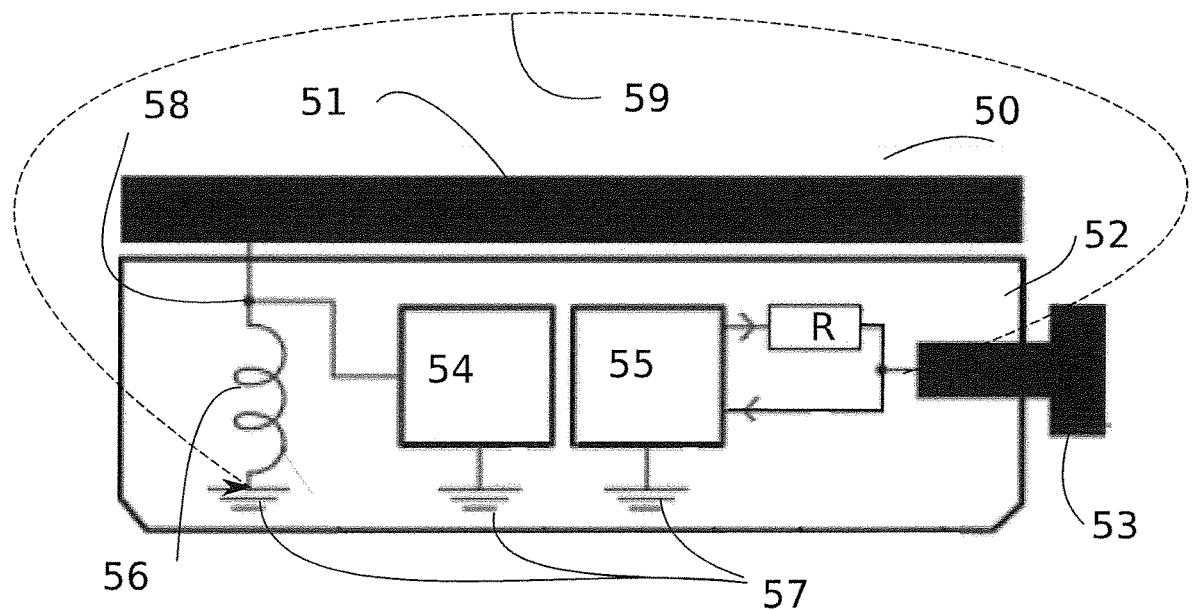
FIG. 17 shows a schematic representation of a wearable diving computer usable in at least some embodiments of the invention.

Referring now to FIG. 17, a schematic representation of a diving computer 170 that is usable in connection with at least some embodiments of the invention is shown. The wearable diving computer has a housing which consists mainly of a conductive bezel 171 and a body 172. The bezel includes a radiator element, such an ungrounded outer radiator element 202, 302, 402, 502 and 232 shown in FIGS. 2-5 and in FIG. 15, respectively. A radio unit 174 is functionally connected to the diving computer circuitry (not shown) enclosed in the housing, and has a conductive coupling 178 to the radiator element, for enabling wireless communication between the diving computer and external devices. A suitable core circuit for the radio unit may be a Bluetooth processor (BLE SoC) nRF51422 by Nordic Semiconductor®, for example. The radio unit 174 may also comprise a balun transformer like NRF02D3 by ST Microelectronics® between the Bluetooth processor and the inductance 176, for example, to convert between balanced and unbalanced signals and/or to transform impedances between the processor and inductance circuits. The inductance 176 may be a coil such as LQG15HS22NJ02D by Murata®, with which the antenna is grounded for DC currents and a current path 179 for the water contact is established.

Also included is a water contact detector circuit 175 which is arranged to sense when the wearable diving computer enters an underwater condition. An exemplary push button 173 extending through the body 172 is operable from the outside of the body. The push-button includes a conductive water contact surface, enabling the push-button to convey a water contact signal to the water contact detector circuit 175, sensed as a voltage drop over the resistor R. The push-button 173 may be a push-button or navigation button that is part of the user interface of the diving computer, and using it in that capacity has no effect on the water contact detection or vice versa.

Instead of a push-button, the water contact may be arranged in a navigation-type of button, or by any surface or structure in the housing being in contact with water when the diving computer is submerged.

As an alternative to sensing a voltage drop over the resistor R may be current sensing in the water contact detector circuit using a current supply. This may render the resistor R obsolete and the detection may be made by a semiconductor circuit. Further embodiments may include various signal forms, like DC, pulsed DC, or AC (alternating current).

The underwater condition sensing circuit in FIG. 17 comprises the conductive coupling 178 between the radiator element in the bezel 171 and the radio unit 174 and a low-pass filter, which comprises at least the inductor 176, connected at one end to the conductive coupling 178 and at the other end to the ground potential 177 of the diving computer.

Thus the underwater condition sensing circuit 178, 176 and 177 senses when water establishes a conductive path 179 between from water contact surface of the push-button to the bezel 171 and the radiator element onwards as a DC short-circuit through the inductance 176 to ground, thus providing in the sensing loop of the resistor R a voltage indication of an underwater condition to the water contact detector circuit 175.

Importantly, the radio unit 174 will not see this short-circuit of its radiator element, because of the low-pass filter 176. Typically the radio unit operates in the 2.4 GHz range for Bluetooth applications and in the 1.5 GHz range for GPS applications, for example. A DC short-circuit will pass the filter 176, but will not pass GHz range signals.

According to some embodiments, the water contact detector circuit 175 may be arranged to automatically switch to a dive operating mode of the diving computer when an underwater condition is detected. In some embodiments, the contact detector circuit 175 may be arranged to deactivate the radio unit when an underwater condition is detected, for example in order to reduce power consumption.

Figure 18:
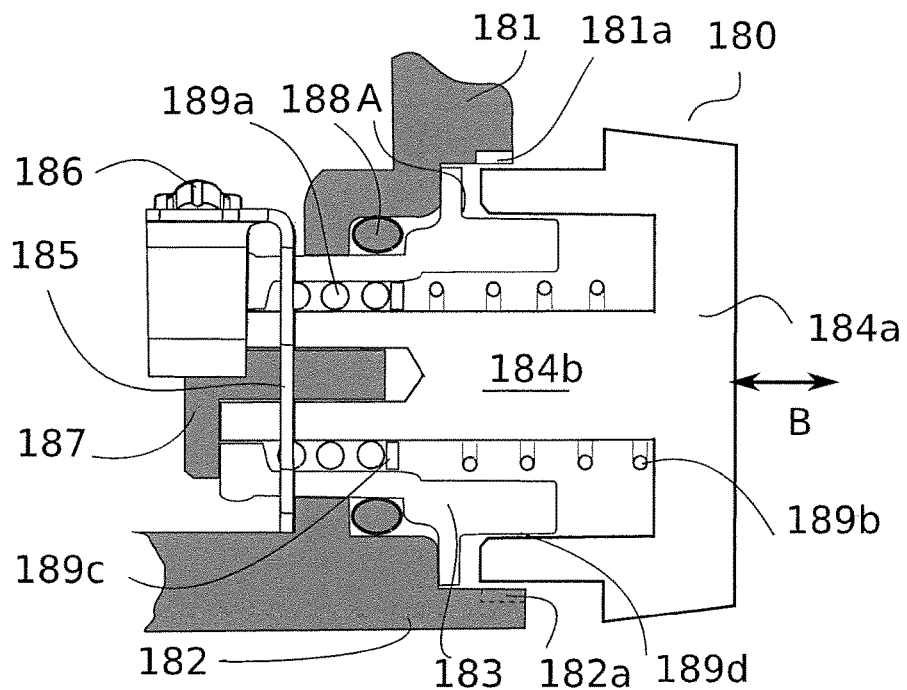
FIG. 18 shows a push-button construction that is usable at least in some embodiments of the invention.

Referring now to FIG. 18, a push-button component that is usable at least in some embodiments of the invention is shown. The push-button component interfaces with the device housing at an aperture in the housing, and has a button part 180 having a touch surface portion 184a with a circular or otherwise suitably shaped form to be engaged by a touch or press from a user's finger. The button part 180 also includes a shaft portion 184b connected to the touch surface portion 184a and which preferably is integral with and perpendicular to the shaft portion 184b, as shown. The shaft portion 184b is sliding in the fixed guide portion 183 inwards and outwards, as shown by arrow B, when the button part 180 is engaged by a user.

The fixed guide portion 183 acts as a bushing for the button part 180. The shaft portion 184b of the push-button is supported inside the guide part by greased O-rings 189a. A spring 189b with a washer 189c provides the necessary return force and resistance to the touch surface 184a.

At the other end of the guide portion 183, there is a further bushing surface 189d for the touch surface portion 184a of the button part.

The outward movement of the push-button 184a, 184b is limited by a stopper 187, which abuts against an end portion of the guide part 183.

Preferably, the fixed guide part 183 includes a conductive water contact surface area A, where water will enter in an underwater condition, which may then be sensed via a conducting element 185 and a detector circuit 186, as described above. Obviously, the water contact may be made from any conductive surface in the push-button component. However, because the button 184a, 184b may be made from non-conductive material, allowing more freedom of design and the device aesthetics can be improved, and because a more reliable connection to a sensor circuit can be made from a fixed structure, the water contact surface area A on the guide part 183 is a preferred solution. In some embodiments, there may be grooves 181a and 182a (dashed line) at the body part 181 and the bottom part 182 of the device, respectively. The purpose of the grooves are to flush in water to the water contact surface area A of the guide part 183, and to prevent the buildup of pressure and/or air bubbles in between the push-button 180 and the housing of the device, that would impair the water contact to the guide part. The shaft portion 184b and the button portion 184a may be coated, for example to inhibit creep currents from causing false water electrical contact indications.

Water is blocked from entering the interior of the device by a seal, such as an O-ring 188, running between the guide part 183, a body part 181 and a bottom part 182 of the device, respectively.

In FIG. 18 is also shown an inventive clip washer 185 that is pressed or snapped onto the guide part 183, and a connector element that extends from the clip washer 185 and provides electrical connection stud 186. The clip washer will be described in detail in the following, referring to now FIGS. 19 and 20.

Figure 19:
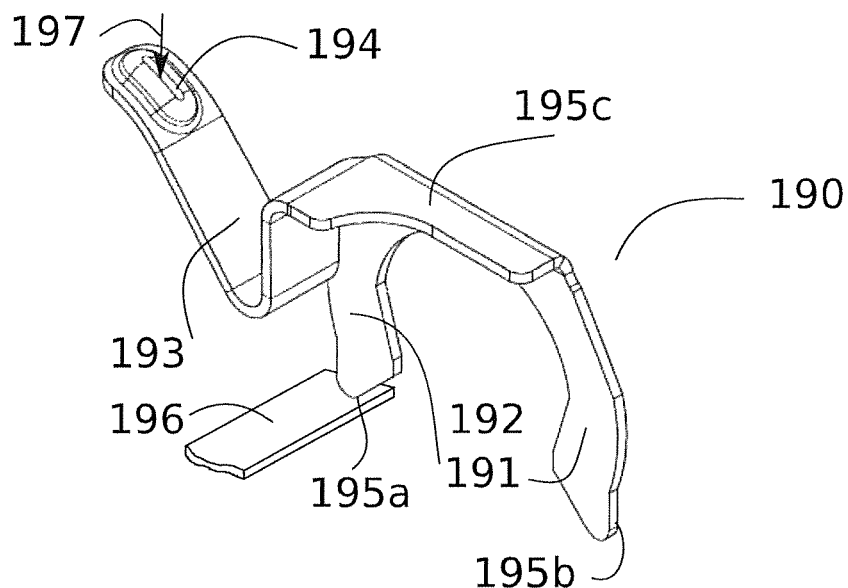
FIG. 19 shows a clip washer that may be used in at least some embodiments of the inventive assembly.

In FIG. 19, a clip washer that may be used in some embodiments of the inventive assembly is shown. The clip washer 190 is preferably made of an integral piece of sheet metal, having a general appearance of a circlip fastener consisting of a semi-flexible metal ring 191 with an open end which can be pressed or snapped onto the guide portion 183 in FIG. 18.

The clip washer is provided with a flexible connector element 193 extending a distance from the washer to provide an electrical connection, such as contact stud 194, for a circuit in the device. Such a circuit may be a water contact detection circuit, as shown in FIG. 17. The element 193 may be integral with the clip 190 and made of the same piece of sheet metal, or it may be a tongue, a spring, a wire, or any other suitable connector element.

In some embodiments the inner edges 192 of the clip ring 191 may be sharp and cut in to a conductive surface of the guide portion, thus locking itself into place when pressed onto the guide portion. In some further embodiments, the inner edges 192 of the clip ring 191 may be rounded and to snap into a circumferential groove on the conductive surface of the guide portion, thus locking itself into place when pressed onto a portion.

As the flexible connector element 193 at the contact stud 194 is subject to a force 197 from a counterpart stud on a printed circuit board or the like, it is in some embodiments preferable to ensure that the clip washer 190 does not start to rotate around the guide portion. This may be prevented by providing support from the device housing or structure at some point 195a, 195b, 195c of the clip washer. In FIG. 19 is shown such a support 196 structure at point 195a, which prevents a downward force 197 from rotating the washer 190.

Figure 20:
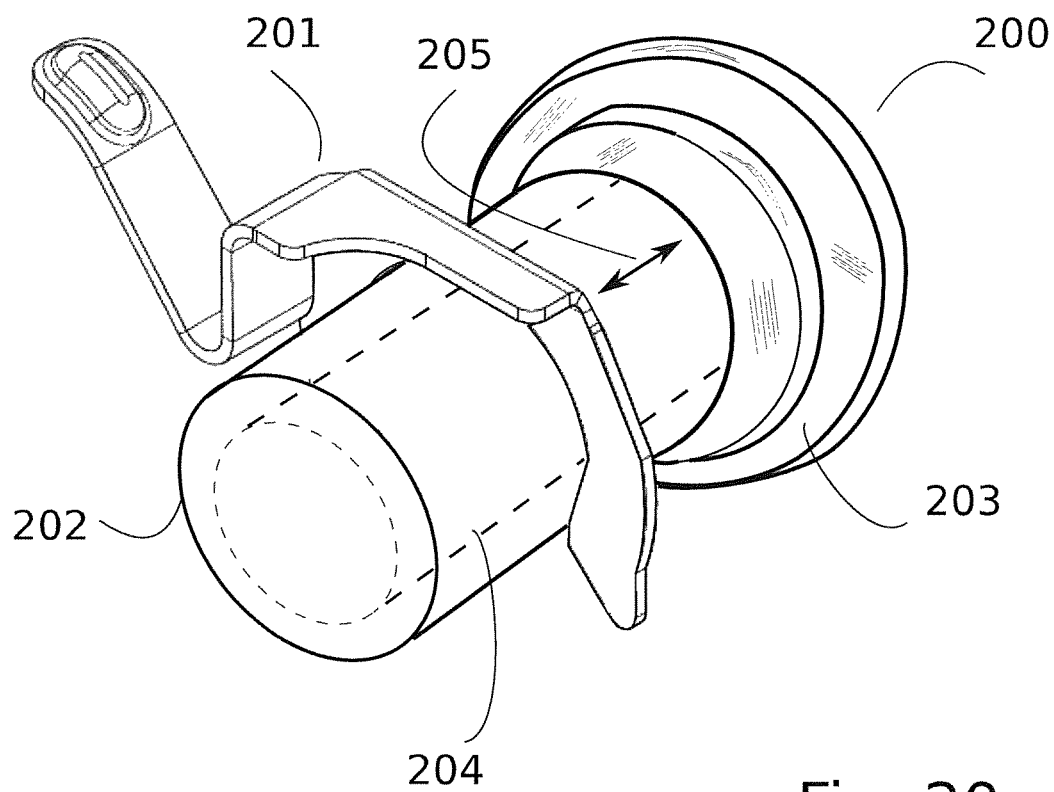
FIG. 20 shows some essential parts of an inventive water contact detector assembly.

FIG. 20 shows some essential parts of an inventive assembly. A clip washer 201 as shown in FIG. 19 is mounted, by pressing and/or snapping, onto a guide portion 202 of an assembly, similar to the guide portion 183 of FIG. 18. The guide portion supports a button part 200, consisting of a touch surface portion 203 and a shaft portion 204 in the guide portion, as shown by dashed lines. The shaft portion 204 slides in the guide portion inwards and outwards, as shown by arrow 205, when the button part 200 is engaged by a user.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A water contact detector assembly for detecting an underwater condition in a device, the assembly comprising:
   a device housing;
   a push-button component attached to said housing, said component comprising a button part and a hollow guide part, wherein said button part consists of a touch surface portion and a stud portion, said stud portion being arranged to slide inside said hollow guide part when said button part is being engaged by a user, and wherein said guide part is at least in part conductive and subject to be exposed to water when said device is submerged;
   a clip washer made of sheet metal that is received by the guide part to lock itself in place onto a conductive portion of said guide part;
   said clip washer being provided with a connector element extending a distance from said washer to provide an electrical connection to a contact stud in said device.

2. The water contact detector assembly according to claim 1, wherein said connector element is integral with the clip washer and extends from the same as a flexible tongue.

3. The water contact detector assembly according to claim 1, wherein said clip washer is locked onto said guide part by means of sharp inner edges of the clip cutting into the guide part material upon assembly.

4. A water contact detector assembly according to claim 2, wherein said clip washer is locked onto said guide part by means of sharp inner edges of the clip cutting into the guide part material upon assembly.

5. The water contact detector assembly according to claim 1, wherein said clip washer is locked onto said guide part by means of inner edges of the clip locking with a spring force into a groove of the guide part material upon assembly.

6. The water contact detector assembly according to claim 2, wherein said clip washer is locked onto said guide part by means of inner edges of the clip locking with a spring force into a groove of the guide part material upon assembly.

7. The water contact detector assembly according to claim 1, wherein said connector element provides an electrical connection to a contact stud of a water contact detector circuit arranged to sense an underwater condition of said device.

8. The water contact detector assembly according to claim 2, wherein said connector element provides an electrical connection to a contact stud of a water contact detector circuit arranged to sense an underwater condition of said device.

9. The water contact detector assembly according to claim 3, wherein said connector element provides an electrical connection to a contact stud of a water contact detector circuit arranged to sense an underwater condition of said device.

10. The water contact detector assembly according to claim 4, wherein said connector element provides an electrical connection to a contact stud of a water contact detector circuit arranged to sense an underwater condition of said device.

11. The water contact detector assembly according to claim 5, wherein said connector element provides an electrical connection to a contact stud of a water contact detector circuit arranged to sense an underwater condition of said device.

12. The water contact detector assembly according to claim 1, wherein said device housing, at the aperture which interfaces with said push-button component, is provided with grooves flushing water to a water contact surface area of said guide part.

13. The water contact detector assembly according to claim 2, wherein said device housing, at the aperture which interfaces with said push-button component, is provided with grooves flushing water to a water contact surface area of said guide part.

14. The water contact detector assembly according to claim 3, wherein said device housing, at the aperture which interfaces with said push-button component, is provided with grooves flushing water to a water contact surface area of said guide part.

15. The water contact detector assembly according to claim 4, wherein said device housing, at the aperture which interfaces with said push-button component, is provided with grooves flushing water to a water contact surface area of said guide part.

16. The water contact detector assembly according to claim 5, wherein said device housing, at the aperture which interfaces with said push-button component, is provided with grooves flushing water to a water contact surface area of said guide part.

17. The water contact detector assembly according to claim 6, wherein said device housing, at the aperture which interfaces with said push-button component, is provided with grooves flushing water to a water contact surface area of said guide part.

18. The water contact detector assembly according to claim 7, wherein said device housing, at the aperture which interfaces with said push-button component, is provided with grooves flushing water to a water contact surface area of said guide part.

19. The water contact detector assembly according to claim 1, wherein said clip washer is supported by said device housing at a point which prevents the clip washer from rotating around said guide part.

20. A diving computer comprising a water contact detector assembly for detecting an underwater condition in a device, the assembly comprising:
   a device housing;
   a push-button component attached to said housing, said component comprising a button part and a hollow guide part, wherein said button part consists of a touch surface portion and a stud portion, said stud portion being arranged to slide inside said hollow guide part when said button part is being engaged by a user, and wherein said guide part is at least in part conductive and subject to be exposed to water when said device is submerged;

a clip washer made of sheet metal that is received by the guide part to lock itself in place onto a conductive portion of said guide part;

said clip washer being provided with a connector element extending a distance from said washer to provide an electrical connection to a contact stud in said device.

* * * * *